United States Patent
Wilflinger et al.

(10) Patent No.: US 8,438,942 B2
(45) Date of Patent: May 14, 2013

(54) VEHICLE TRANSMISSION GEAR LOCKING MECHANISM

(75) Inventors: Johann Wilflinger, Linz (AT); Patrick Raffelsberger, Hofkirchen Im Traunkreis (AT); Robert Wagner, Thalheim Bei Wels (AT); Andre Gilbert, Sherbrooke (CA); Jean-Philippe Houle, Sherbrooke (CA)

(73) Assignee: BRP-Powertrain GmbH & Co. KG, Gunskirchen (AT)

( * ) Notice: Subject to any disclaimer, the term of this patent is extended or adjusted under 35 U.S.C. 154(b) by 268 days.

(21) Appl. No.: 12/894,265

(22) Filed: Sep. 30, 2010

(65) Prior Publication Data
US 2012/0079906 A1 Apr. 5, 2012

(51) Int. Cl.
*F16H 59/00* (2006.01)
*F16H 61/00* (2006.01)
*F16H 63/00* (2006.01)
*B60K 20/00* (2006.01)
*G05G 5/08* (2006.01)

(52) U.S. Cl.
USPC .............. 74/337.5; 74/473.24; 74/473.26

(58) Field of Classification Search ............ 74/335, 74/337.5, 343, 473.1, 473.21, 473.22, 473.23, 74/473.24, 473.25, 473.26
See application file for complete search history.

(56) References Cited

U.S. PATENT DOCUMENTS

| 4,455,884 | A | 6/1984 | Tsuruta et al. |
| 4,754,662 | A | 7/1988 | Misawa |
| 7,059,210 | B2 * | 6/2006 | Thiessen et al. ............ 74/337.5 |
| 7,617,904 | B1 * | 11/2009 | Einboeck et al. ............ 180/336 |
| 7,841,254 | B2 * | 11/2010 | Ho ............... 74/337.5 |
| 8,091,446 | B2 * | 1/2012 | Ennsmann ................. 74/337.5 |
| 2009/0126522 | A1 * | 5/2009 | Albulushi et al. ............... 74/329 |
| 2009/0205455 | A1 | 8/2009 | Kosugi |
| 2012/0192665 | A1 * | 8/2012 | Gumpesberger et al. ....... 74/325 |

FOREIGN PATENT DOCUMENTS

| EP | 1906065 A1 | 4/2008 |
| GB | 775728 A * | 5/1957 |
| JP | 57161340 A | 10/1982 |

OTHER PUBLICATIONS

English Abstract of JP 57161340, Oct. 4, 1982.

* cited by examiner

*Primary Examiner* — Troy Chambers
*Assistant Examiner* — Jake Cook
(74) *Attorney, Agent, or Firm* — BCF LLP

(57) ABSTRACT

A vehicle transmission comprises a locking mechanism selectively preventing an at least one shift drum disposed on a shift drum shaft from rotating. The locking mechanism is movable between a first position and a second position. When in the first position, the locking mechanism prevents the at least one shift drum from rotating in the first direction to engage a first locked position. When in the second position, the locking mechanism prevents the at least one shift drum from rotating in the second direction to engage a second locked position. The second locked position is sequentially before the first locked position in the first direction.

9 Claims, 19 Drawing Sheets

VEHICLE TRANSMISSION GEAR LOCKING MECHANISM

TECHNICAL FIELD

The present invention relates to vehicle transmission gear locking mechanisms.

BACKGROUND

Vehicle transmissions typically have multiple shift positions. For a given speed of rotation of an input shaft of the transmission, each gear, when engaged, results in a different shift position which corresponds to a different speed of rotation and/or direction of rotation of an output shaft of the transmission. Typically, in transmissions for motorcycles or all-terrain vehicles, the shift positions need to be engaged sequentially. In one example of a vehicle transmission in a three-wheel vehicle, the gears engagement sequence is: reverse shift position, first forward shift position, a neutral shift position (i.e. no gears engaged), second forward shift position, and third forward shift position. The shift positions can also be engaged in the reverse sequence.

Some transmissions have a reverse gear lock. The reverse gear lock prevents from engaging the reverse shift position when driving forward. When the reverse gear lock is actuated, the driver is prevented from downshifting to the reverse gear when only downshift to the first gear is desired. The reverse gear lock is typically activated by default, and in order to engage the reverse gear, the driver usually has to press on a button on the handlebar (or in some cases move a pedal) to release the gear locking mechanism. When the gear locking mechanism is released, the driver can access the reverse shift position as well as all the other shift positions.

Moreover, when the neutral shift position is disposed sequentially between the first and the second shift positions, the driver may find it difficult to find the neutral shift position. No gears are engaged in the neutral shift position, and the driver may hardly feel the passage through the neutral shift position when downshifting or upshifting between the first and second shift positions.

Therefore, there is a need for a vehicle transmission which at least facilitates finding the neutral shift position, and prevents the reverse shift position from being engaged when driving forward.

SUMMARY

Example embodiments of a vehicle gear locking mechanism according to the present invention ameliorate at least some of the inconveniences present in the prior art.

An example embodiment of a vehicle transmission has a gear locking mechanism that prevents at least one of the shift positions to be engaged when upshifting and at least one of the other shift positions to be engaged when downshifting.

Thus, as broadly embodied, a vehicle transmission comprises an input shaft. First, second and third input gears are disposed on the input shaft. A transmission shaft is disposed parallel to the input shaft. The input shaft is selectively driving the transmission shaft. First, second, and third transmission gears are disposed on the transmission shaft. The first transmission gear is engaging the first input gear. The second transmission gear is engaging the second input gear. The third transmission gear is engaging the third input gear. A shift drum shaft is disposed parallel to the transmission shaft. At least one shift drum is disposed on the shift drum shaft. The at least one shift drum is selectively operatively connected to the first, second, and third input gears and the first, second and third transmission gears. The at least one shift drum is rotatable: sequentially between a first position, a second position, a third position, and a fourth position in a first direction, and sequentially between the fourth position, the third position, the second position, and the first position in a second direction. When in the first position, the at least one shift drum operatively engages one of the first input gear and the first transmission gear such that the input shaft drives the transmission shaft via the first input gear and the first transmission gear. When in the second position, the at least one shift drum operatively engages one of: one of the second input gear and the second transmission gear such that the input shaft drives the transmission shaft via the second input gear and the second transmission gear, and none of the first, second, and third input gears, and the first, second and third transmission gears, such that the transmission shaft is not driven by the input shaft. When in the third position, the at least one shift drum operatively engages another one of the: one of the second input gear and the second transmission gear such that the input shaft drives the transmission shaft via the second input gear and the second transmission gear, and none of the first, second, and third input gears, and the first, second and third transmission gears, such that the transmission shaft is not driven by the input shaft. When in the fourth position, the at least one shift drum operatively engages the third input gear and the third transmission gear such that the input shaft drives the transmission shaft via the third input gear and the third transmission gear. A locking mechanism is selectively preventing the at least one shift drum from rotating. The locking mechanism is movable between a first position and a second position. When in the first position, the locking mechanism prevents the at least one shift drum from rotating in the first direction between a first unlocked position and a first locked position. The first unlocked position is sequentially prior to the first locked position in the first direction. When in the second position, the locking mechanism prevents the at least one shift drum from rotating in the second direction between a second unlocked position and a second locked position. The second unlocked position is sequentially prior to the second locked position in the second direction. The first locked position is one of the second, third and fourth positions. The second locked position is one of the first, second, and third positions. When the first locked position is the second position, the second locked position is the first position. When the first locked position is the third position, the second locked position is one of the first and second positions. When the first locked position is the fourth position, the second locked position is one of the first, second and third positions.

In an additional aspect, the first position corresponds to a reverse shift position and the at least one shift drum operatively engages one of the first input gear and the first transmission gear such that the first input gear drives the first transmission gear via an idler gear and such that the input shaft drives the transmission shaft via the first input gear, the first transmission gear and the idler gear. The second position corresponds to a first forward shift position and the at least one shift drum operatively engages one of the second input gear and the second transmission gear such that the input shaft drives the transmission shaft via the second input gear and the second transmission gear. The third position corresponds to a neutral shift position and the transmission shaft is not driven by the input shaft. The fourth position corresponds to a second forward shift position and the at least one shift drum operatively engages one of the fourth input gear and the fourth transmission gear such that the input shaft drives the transmission shaft via the fourth input gear and the fourth transmission gear.

In a further aspect, the locking mechanism comprises a drum rotatably disposed on the shift drum shaft, and a lever pivotable between a first and a second position. The lever selectively abuts the drum for preventing the drum to rotate. When the locking mechanism is the first position, the lever is in the first position and the lever abuts the drum. When the locking mechanism is the second position, the lever is in the second position and the lever abuts the drum.

In an additional aspect, the drum is integrally formed with the at least one shift drum.

In a further aspect, the lever has first and second abutment surfaces. The drum has corresponding first and second abutment surfaces. When the locking mechanism in the first position, the first abutment surface of the lever abuts against the corresponding first abutment surface of the drum when preventing the at least one shift drum from rotating in the first direction to engage the first locked position. When the locking mechanism in the second position, the second abutment surface of the lever abuts against the corresponding second abutment surface of the drum when preventing the at least one shift drum from rotating in the second direction to engage the second locked position.

In an additional aspect, the first abutment surface of the drum is an end of a first recess. The second abutment surface of the drum is an end of a second recess.

In a further aspect, the first and second recesses are portions of circumferential grooves.

In an additional aspect, the first and second recesses are separated by an apex.

In a further aspect, the lever has a first arm and a second arm. The first arm includes the first abutment surface. The second arm includes the second abutment surface.

In an additional aspect, the first arm is longer than the second arm. The first recess is disposed radially inwardly of the second recess.

In another aspect a vehicle transmission is provided. The vehicle transmission comprises an input shaft, and a plurality of input gears disposed on the input shaft. A transmission shaft is disposed parallel to the input shaft, the input shaft selectively driving the transmission shaft. A plurality of transmission gears is disposed on the transmission shaft. Each one of the plurality of transmission gears is engaging a single corresponding one of plurality of the input gears. Each one of the plurality of input gears is engaging a single corresponding one of the plurality of transmission gears. A shift drum shaft is disposed parallel to the transmission shaft. At least one shift drum is disposed on the shift drum shaft. The at least one shift drum is rotatable in a first direction and in a second direction between multiple positions. The at least one shift drum is selectively operatively connected to the plurality of input gears and the plurality of the transmission gears. One of the multiple positions is a neutral shift position. When in the neutral shift position, the at least one shift drum operatively engages none of the plurality of input gears and the plurality of transmission gears, such that the transmission shaft is not driven by the input shaft. When in each one of the multiple positions other than the neutral shift position, the at least one shift drum operatively engages one of the plurality of input gears and a corresponding one the plurality of transmission gears such that the input shaft drives the transmission shaft via the one of plurality of the input gears and the corresponding one of plurality of transmission gears. The multiple positions are operatively engaged to the shift drum in a sequential order in the first direction. The multiple positions are operatively engaged to the shift drum in a reverse sequential order in the second direction. A locking mechanism is selectively preventing the at least one shift drum from rotating. The locking mechanism is movable between a first position and a second position. When in the first position, the locking mechanism prevents the at least one shift drum from rotating in the first direction to engage a first locked position. When in the second position, the locking mechanism prevents the at least one shift drum from rotating in the second direction to engage a second locked position. The second locked position is sequentially prior to the first locked position in the first direction.

In a further aspect, when in the first position, the locking mechanism prevents the at least one shift drum to further engage positions of the multiple positions that are sequentially consecutive to the first locked position in the first direction.

In an additional aspect, when in the second position, the locking mechanism prevents the at least one shift drum to engage positions of the multiple positions that are sequentially consecutive to the second locked position in the second direction.

In a further aspect, the multiple positions are at least first, second, third and fourth positions. The first position corresponds to a reverse shift position. The second position corresponds to a first forward shift position. The third position corresponds to the neutral shift position. The fourth position corresponds to a second forward shift position. The first locked position is the second forward shift position. The second locked position is the reverse shift position.

In an additional aspect, the locking mechanism comprises a drum rotatably disposed on the shift drum shaft, and a lever pivotable between a first and a second position. The lever is selectively abutting the drum for preventing the drum to rotate. When the locking mechanism is the first position, the lever is in the first position and the lever abuts the drum. When the locking mechanism is the second position, the lever is in the second position and the lever abuts the drum.

In a further aspect, the drum is integrally formed with the at least one shift drum.

In an additional aspect, the lever has first and second abutment surfaces. The drum has corresponding first and second abutment surfaces. When the locking mechanism in the first position, the first abutment surface of the lever abuts against the corresponding first abutment surface of the drum when preventing the at least one shift drum from rotating in the first direction to engage the first locked position. When the locking mechanism in the second position, the second abutment surface of the lever abuts against the corresponding second abutment surface of the drum when preventing the at least one shift drum from rotating in the second direction to engage the second locked position.

In a further aspect, the first abutment surface of the drum is an end of a first recess, and the second abutment surface of the drum is an end of a second recess.

In an additional aspect, the lever has a first arm and a second arm. The first arm includes the first abutment surface. The second arm includes the second abutment surface.

In a further aspect, the first arm is longer than the second arm, and the first recess is disposed radially inwardly of the second recess.

Additional and/or alternative features, aspects, and advantages of embodiments of the vehicle transmission will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present invention will be described with respect to a three-wheeled vehicle having a handlebar for steering. However it should be understood that the invention could be used in other wheeled vehicles such as, but not limited to, a motorcycle, a scooter, and an all-terrain vehicle (ATV). U.S. Pat. No. 6,732,830, issued May 11, 2004, the entirety of which is incorporated herein by reference, describes the general features of an ATV.

Figure 1:
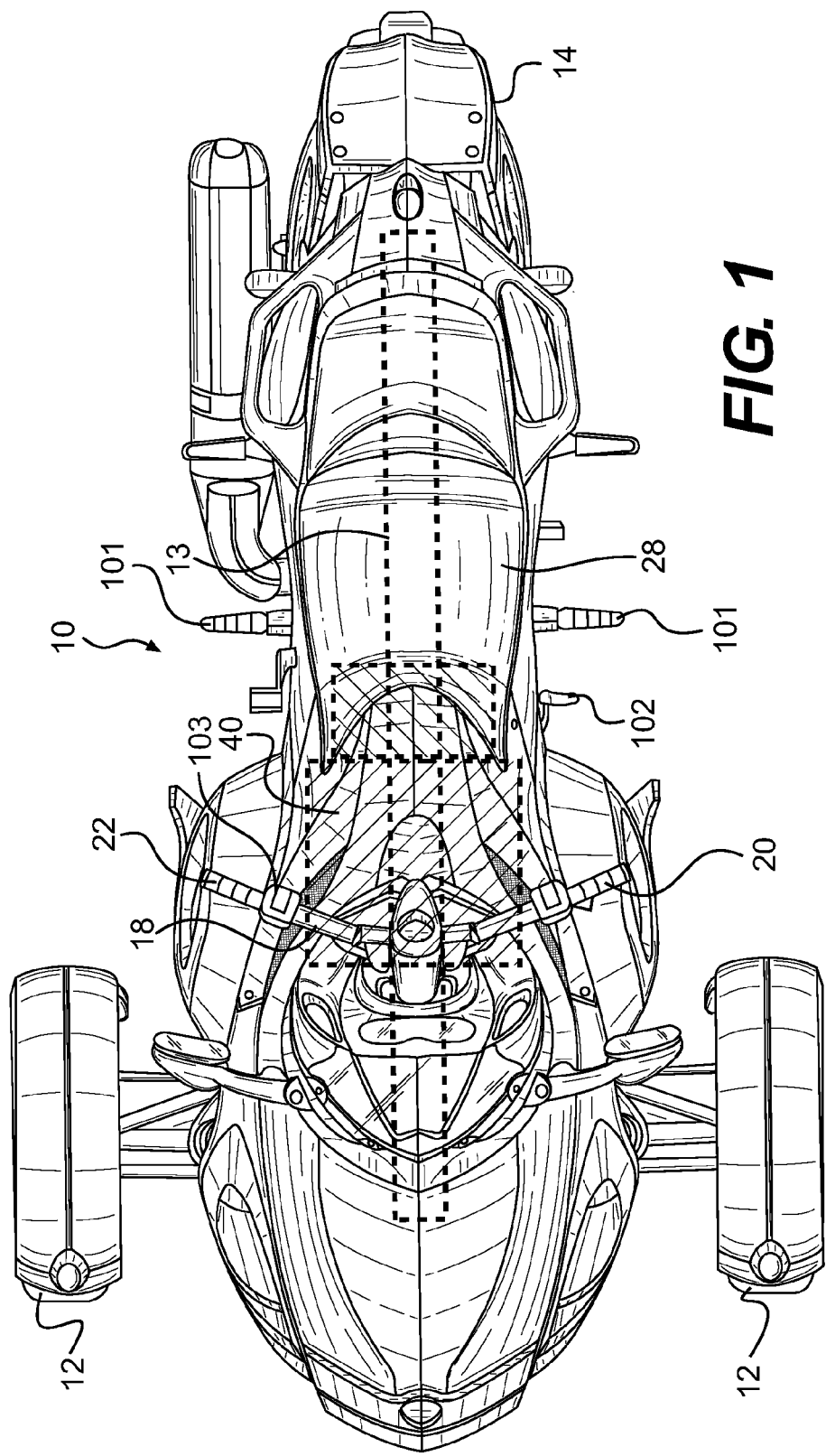
FIG. 1 is a top plan view of a three-wheel vehicle.

Referring to FIG. 1, a three-wheeled vehicle 10 has a frame 13 (shown schematically) to which two front wheels 12 and one rear wheel 14 are connected. A handlebar 18 is connected to the two front wheels 12 for steering the two front wheels 12. The handlebar 18 has a left handle 20 and a right handle 22 disposed at ends of the handlebar 18. The handlebar 18 is disposed forwardly of a straddle seat 28 which is supported by the frame 13. An engine 40 and transmission 100 (shown schematically) are disposed on the frame 13 vertically below the seat 28. Footrests 101 are mounted on the left and right sides of the vehicle 10 below the straddle seat 28. A gear selector pedal 102 is mounted on the left side of the vehicle 10 forwardly of the left footrest 101, to be operated by the left foot of the driver. The gear selector pedal 102 is used to select a shift position of the transmission 100. It is contemplated that the gear selector 102 could alternatively be a finger operated button on the handlebar 18, a switch, a hand actuated lever, or any other suitable type of selector. A gear locking button 103, in the form of a finger actuated button, is mounted on the right handle 22 of the handlebar 18. The gear locking button 103 is used to prevent one or more shift positions to be engaged, as described in greater detail below. It is contemplated that the gear locking button 103 could alternatively each be a switch, a pedal, a hand actuated lever, or any other suitable type of actuator.

The three-wheel vehicle 10 has other features well known in the art. Some of these features can be found in U.S. Pat. No. 6,948,581, issued Sep. 27, 2005, the entirety of which is incorporated herein by reference.

Figure 2:
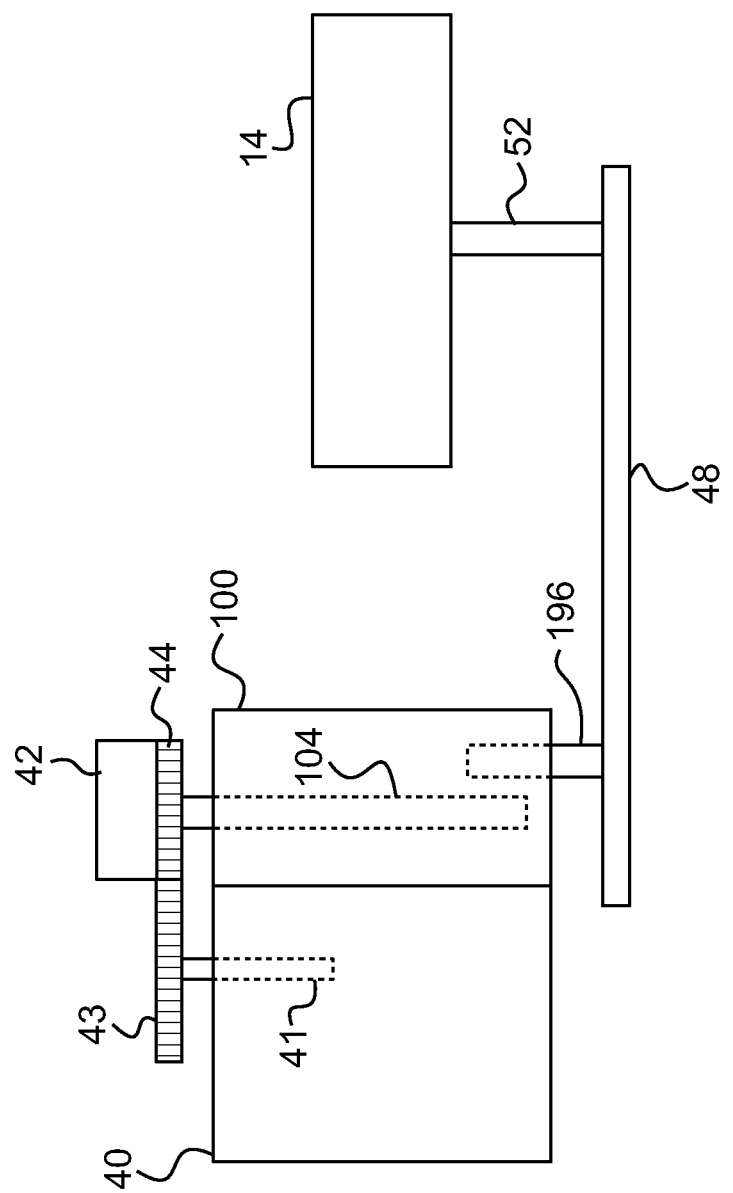
FIG. 2 is a schematic illustration of a top view of a drivetrain of the three-wheel vehicle of FIG. 1.

Turning now to FIG. 2, a drivetrain of the three-wheel vehicle 10 will be described. A crankshaft 41 of the engine 40 of the three-wheel vehicle 10 transmits torque to an input shaft 104 of the transmission 100 via a primary drive gear 43 on the crankshaft 41 and a clutch 42 with a clutch drive gear 44 coupled to the input shaft 104. As will be described in greater detail below, the input shaft 104 transmits torque to a transmission shaft 196 which is also an output shaft of the transmission 100. A belt drive gear (not shown) connected to an end of the transmission shaft 196 receives a portion of a toothed belt 48 thereon. Another portion of the toothed belt 48 is received on a toothed belt gear (not shown) connected to a wheel shaft 52 of the rear wheel 14, such that the toothed belt 48 transmits torque from the transmission shaft 196 to the rear wheel 14. It is contemplated that the rear wheel 14 could alternatively be driven by a chain and a sprocket or by a driveshaft. The transmission shaft 196 is disposed within the transmission 100 parallel to the input shaft 104. It is contemplated that the output shaft could be disposed perpendicularly to the input shaft 104 to accommodate a drivetrain layout different from the one shown in FIG. 2. It is contemplated that the transmission shaft 196 could be separate to the output shaft, and that the transmission shaft 196 could be operatively connected to the output shaft.

Figure 4:
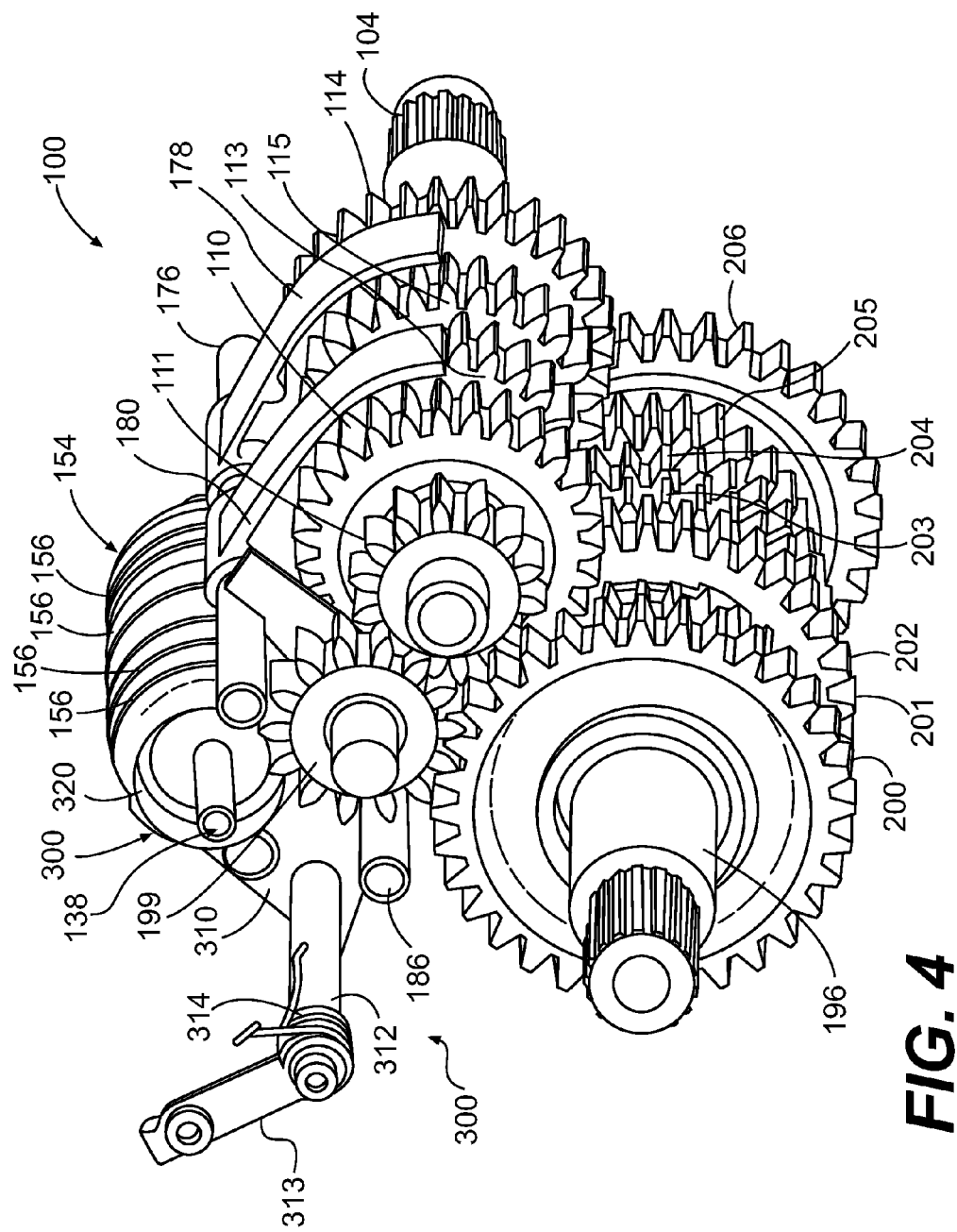
FIG. 4 is a perspective view taken from a front, bottom, left side of the transmission of the three-wheel vehicle of FIG. 1.
Figure 5:
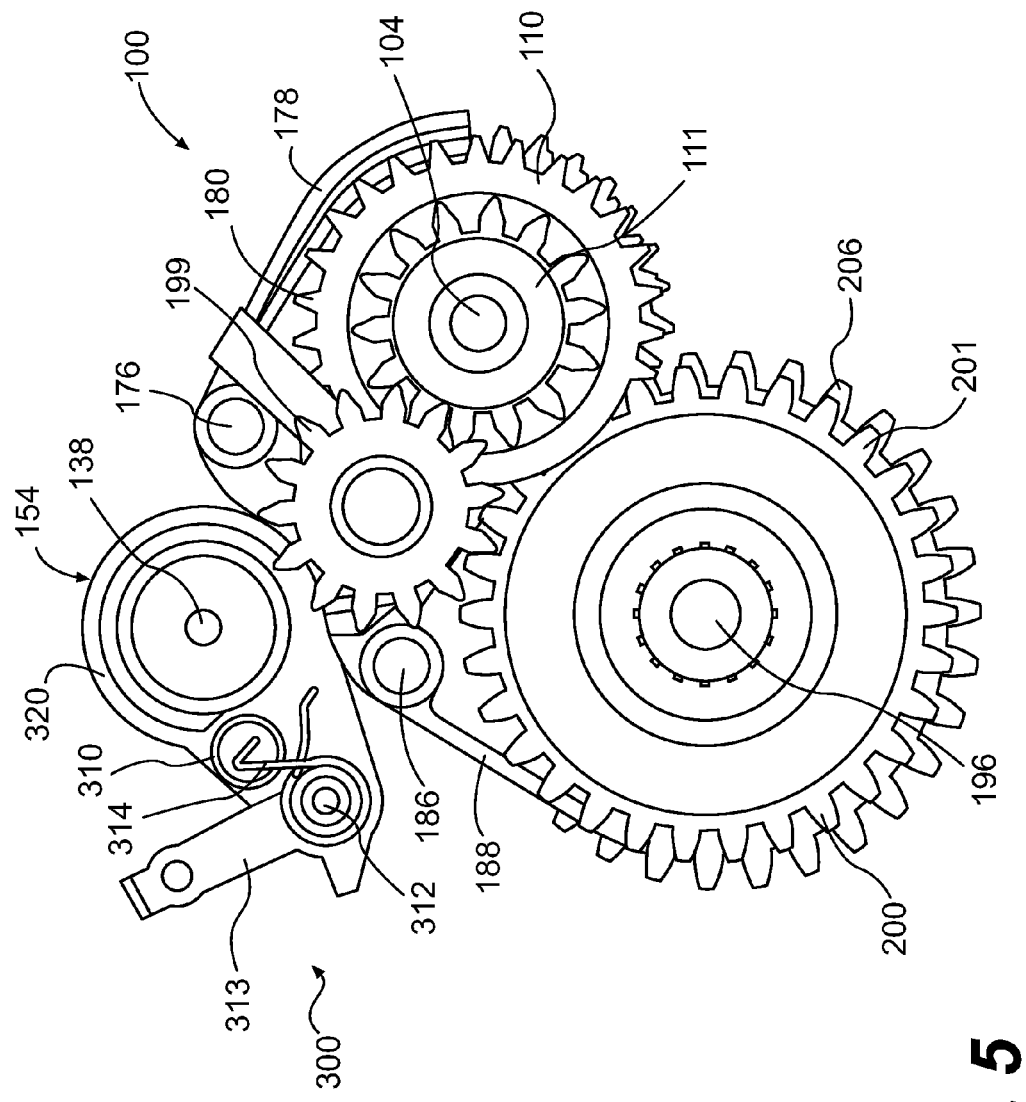
FIG. 5 is a left side view of the transmission of FIG. 4.

The transmission 100 has a housing 108 (partially shown in FIGS. 9 to 18), which forms a mounting plate (not shown) for mounting the transmission 100 to the engine 40. A shifting assembly (not shown) is mounted on a shift shaft (not shown). The shift shaft is operatively connected to the gear selector 102. When the operator of the three-wheel vehicle 10 moves the gear selector 102 on the handlebar 18, the shift shaft rotates. The rotational movement of the shift shaft is transferred to a shift drum shaft 138 (shown in FIG. 4). The shift drum shaft 138 can be rotated in an upshift and a downshift direction. The upshift and downshift directions of rotation of the shift drum shaft 138 are illustrated by arrows 350, 351 in FIG. 9B respectively. An indexing wheel (not shown), connected to the shift drum shaft 138, helps position the shift drum shaft 138 in one of the shift positions.

Figure 3:
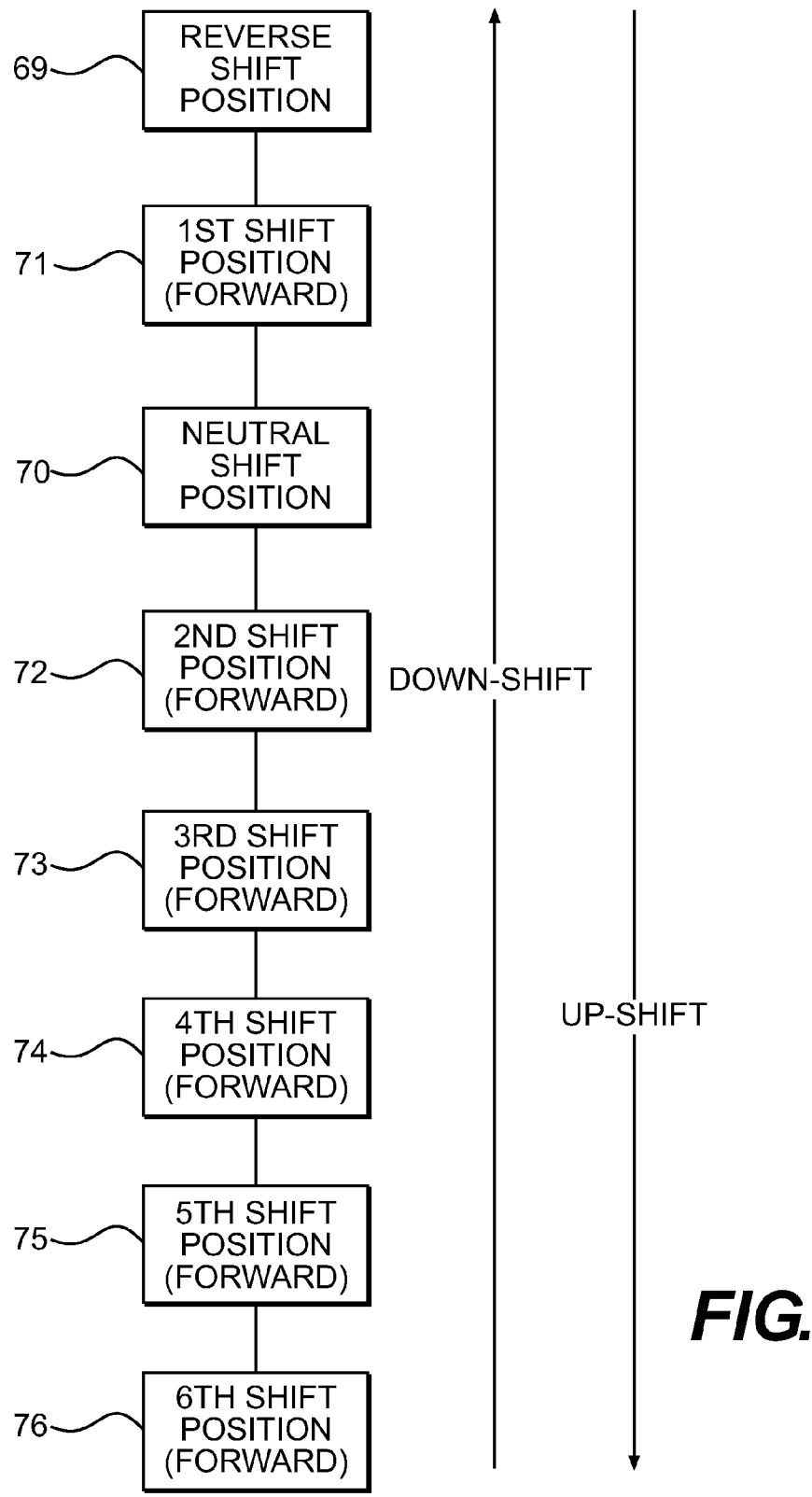
FIG. 3 is a schematic illustration of a shift position sequence for a transmission of the three-wheel vehicle of FIG. 1.

Turning to FIG. 3, the vehicle transmission 100 has eight shift positions, which are sequentially: reverse shift position 69, first shift position 71, neutral shift position 70, second shift position 72, third shift position 73, fourth shift position 74, fifth shift position 75, and sixth shift position 76. The shift positions are engageable sequentially in both the upshift direction 350 and the downshift direction 351. It is contemplated that the sequential order could be different than the one shown in FIG. 3. For example, the neutral shift position 70 could be disposed sequentially between the reverse 69 and the first 71 shift positions. It is also contemplated that the transmission 100 could have more or less than eight shift positions.

Turning now to FIGS. 4 to 7, the transmission 100 will be described in greater details. The input shaft 104 is disposed parallel to the shift drum shaft 138. Three input gears 110, 112, 114 are rotatably connected to the input shaft 104 each via a bearing 131 (shown in FIG. 7) such that the input gears 110, 112, 114 can rotate independently of the input shaft 104. Four other input gears 111, 113, 115, 117 are rotatably fixed to the input shaft 104 and rotate with the input shaft 104. The input gear 115 is a dog gear. As will be described below, upon sliding, the input gear 115 engages the input gear 112. The input gears 113 and 115 are splined to the input shaft 104 and can be displaced along the input shaft 104 at splined portion 130 (shown in FIG. 6). It is contemplated that more or less than three input gears could be rotatably connected to the input shaft 104 and more or less than four input gears could be rotatably fixed to the input shaft 104. The input gear 117 is integrally formed with the input shaft 104. It is contemplated that the input gear 117 could be rotatably fixed to the input shaft 104. The input gears 110 to 117 have different diameters, with input gears 111, 117 having the smallest of the diameters and input gear 114 having the largest of the diameters. The input gears 110 to 117 are disposed so as to cooperate with corresponding transmission gears, as will be described below.

Four transmission gears 200, 202, 204, 206 are rotatably connected to the transmission shaft 196 each via a bearing 231 (shown in FIG. 7), such that the transmission gears 200, 202, 204, 206 can rotate independently of the transmission shaft 196. Three other transmission gears 201, 203, 205 are rotatably fixed to the transmission shaft 196 such that the transmission gears 201, 203, 205 rotate with the transmission shaft 196. The gears 201, 205 are dog gears. As will be described below, upon sliding, the transmission gears 201 and 205 can engage the transmissions gears 200 and 206 respectively. They are splined to the transmission shaft 196 and can be displaced along the transmission shaft 196 at splined portions 230 (shown in shading in FIG. 6). It is contemplated that more or less than four transmission gears could be rotatably connected to the transmission shaft 196, and more or less than three transmission gears could be rotatably fixed to the transmission shaft 196. The transmission gears 200 to 206 have different diameters, with transmission gear 205 having the smallest of the diameters and transmission gear 206 having the largest of the diameters.

Figure 6:
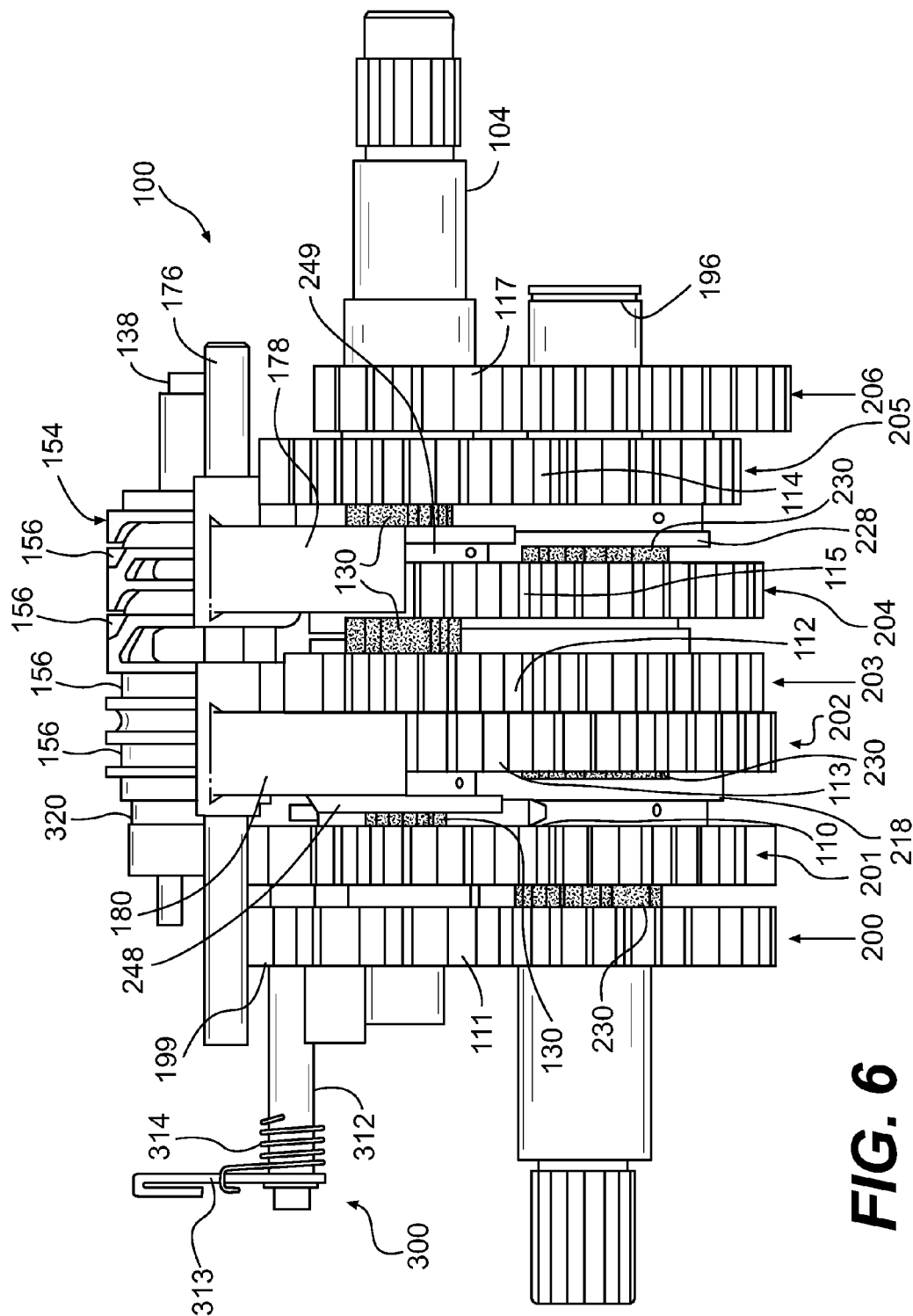
FIG. 6 is a back view of the transmission of FIG. 4.
Figure 7:
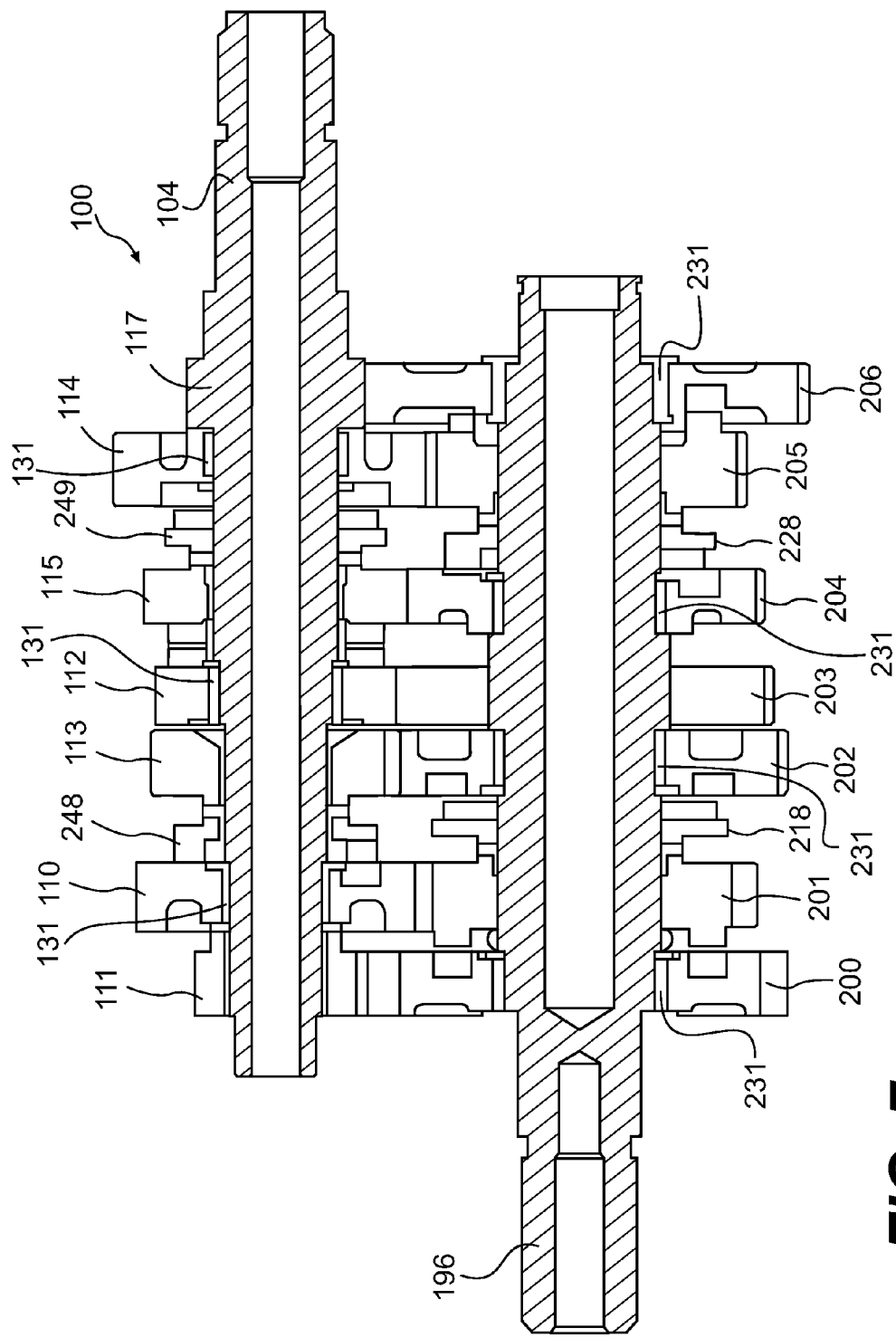
FIG. 7 is a cross-sectional view taken through the transmission shaft and the input shaft of the transmission of FIG. 4 with some elements of the transmission removed for clarity.

Referring more specifically to FIGS. 6 and 7, selective engagement between the input gears 110 to 117 and the transmission gears 200 to 206 and resulting shift positions will now be described. The input gear 110 is operatively connected to the transmission gear 200 via an idler gear 199. When the transmission gear 200 is rotatably fixed to the transmission shaft 196 (via the transmission gear 201 as will be described below), a rotation of the input shaft 104 is transmitted to the transmission shaft 196 by the gears 111, 200 via the idler gear 199 and the reverse shift position 69 is engaged. The input gear 110 is operatively engaged to the transmission gear 201. When the input gear 110 is rotatably fixed to the input shaft 104 (via the shifting sleeve 248 as will be described below), the rotation of the input shaft 104 is transmitted to the transmission shaft 196 by the gears 110, 201 and the fifth shift position 75 is engaged. The input gear 113 is operatively engaged to the transmission gear 202. When the transmission gear 202 is rotatably fixed to the transmission shaft 196 (via the shifting sleeve 218 as will be described below) the rotation of the input shaft 104 is transmitted to the transmission shaft 196 by the gears 113, 202 and the second shift position 72 is engaged. The input gear 112 is operatively engaged to the transmission gear 203. When the input gear 112 is rotatably fixed to the input shaft 104 (via the input gear 115 as will be described below), the rotation of the input shaft 104 is transmitted to the transmission shaft 196 by the gears 112, 203 and the third shift position 73 is engaged. The input gear 115 is operatively engaged to the transmission gear 204. When the transmission gear 204 is rotatably fixed to the transmission shaft 196 (via the shifting sleeve 228 as will be described below), the rotation of the input shaft 104 is transmitted to the transmission shaft 196 by the gears 115, 204 and the fourth shift position 74 is engaged. The input gear 114 is operatively engaged to the transmission gear 205. When the input gear 114 is rotatably fixed to the input shaft 104 (via the shifting sleeve 249, as will be described below), the rotation of the input shaft 104 is transmitted to the transmission shaft 196 by the gears 114, 205 and the sixth gear 76 is engaged. The input gear 117 is operatively engaged to the transmission gear 206. When the transmission gear 206 is rotatably fixed to the transmission shaft 196 (via the transmission gear 205), the rotation of the input shaft 104 is transmitted to the transmission shaft 196 by the gears 117, 206 and the first shift position 71 is engaged. It is contemplated that the correspondence between the input and transmission gears engaged and the resulting shift positions could be different. When all of the gears 200, 110, 202, 112, 204, 114 and 206 are not rotatably fixed to their respective input shaft 104 or transmission shaft 196, the neutral shift position 70 is engaged.

As mentioned above, the shift drum shaft 138 is rotated to select which input gear and corresponding transmission gear become operatively engaged to each other, and as a result which shift position is engaged. The shift drum shaft 138 has a shift drum 154 splined thereon. As such, the shift drum 154 is rotatably fixed to the shift drum shaft 138 and rotates therewith. The shift drum 154 defines four grooves 156 shaped to affect the desired shift sequence of the vehicle transmission 100 by displacing shift forks. It is contemplated that the shift drum 154 could be four shift drums each having one of the grooves 156. It is also contemplated that the shift drum 154 could have more or less than four grooves 156.

A first fork rod 176 is disposed parallel to the shift drum shaft 138. First and second shift forks 178, 180 are slidably disposed on the first fork rod 176. A second fork rod 186 is disposed parallel to the shift drum shaft 138. A third shift fork (not shown) and a fourth shift fork 188 are slidably disposed on the second fork rod 186. The first and second shift forks 178, 180 have pins (not shown) received in the grooves 156 of the shift drum 154 such that when the shift drum 154 rotates by the rotation of the shift drum shaft 138, the pins follow the grooves 156 and cause the shift forks 178, 180 to slide along the first fork rod 176. Similarly, the third shift fork and the fourth shift fork 188 have pins (not shown) received in the grooves 156 of the shift drum 154 such that when the shift drum 154 rotates by the rotation of the shift drum shaft 138, the pins follow the grooves 156 and cause the third shift fork and the fourth shift fork 188 to slide along the second fork rod 186. The pins have a shape corresponding to the one of the grooves 156. It is contemplated that only one or more than two shift rods 176, 186 could be used, and that each fork rod 176, 186 could have only one or more than two shift forks.

As best seen in FIG. 7, a shifting sleeve 248 is integrally formed with the input gear 113 and is disposed between the input gears 110 and 113, and a shifting sleeve 249 is integrally formed with the input gear 115 and is disposed between the input gears 114 and 115. The shifting sleeves 249, 248 rotate with the input shaft 104 and are slideable along the input shaft 104. The first shift fork 178 is received in a groove formed between the input gear 115 and the shifting sleeve 249. The second shift fork 180 is received in a groove formed between the input gear 113 and the shifting sleeve 248. For certain positions of the shift drum 154, the first 178 and second 180 shift forks displace the shifting sleeves 248, 249 and the input gear 115. When the shifting sleeve 248 is displaced by the second shift fork 180 to the left with respect to FIG. 7, it engages the input gear 110 so that the input gear 110 becomes rotatably fixed to the input shaft 104 for rotating with it. When the shifting sleeve 249 is displaced by the first shift fork 178 to the right with respect to FIG. 7, it engages the input gear 114 so that the input gear 114 becomes rotatably fixed to the input shaft 104 for rotating with it. In addition, when the shift fork 178 is displaced to the left with respect to FIG. 7, it engages the input gear 115 with the input gear 112 (the input gear 115 being a dog gear) and the input gear 112 becomes rotatably fixed to the input shaft 104 for rotating with it. Only one of the input gears 110, 112, 114 can be engaged at a time. When the one of the input gears 110, 114 is engaged by its corresponding shifting sleeve 248, 249, a rotation of the engaged input gear 110, 114 is transferred to the corresponding transmission gear 201, 205 for transferring rotation from the input shaft 104 to the transmission shaft 196. When the input gear 112 is engaged by the input gear 115 (being a dog gear), a rotation of the engaged input gear 112 is transferred to the corresponding transmission gear 203 for transmitting rotation from the input shaft 104 to the transmission shaft 196.

Still referring to FIG. 7, a shifting sleeve 218 is integrally formed with the transmission gear 201 and is disposed between the transmission gears 201 and 202, and a shifting sleeve 228 is integrally formed with the transmission gear 205 and is disposed between transmission gears 204 and 205. The shifting sleeves 218, 228 rotate with the transmission shaft 196 and are axially movable with respect to the transmission shaft 196. The third shift fork is received in a groove formed between the transmission gear 205 and the shifting sleeve 228. The fourth shift fork 188 is received in a groove formed between the transmission gear 201 and the shifting sleeve 218. For certain positions of the shift drum 154, the third and fourth 188 shift forks displace the shifting sleeves 228, 218 and the transmission gears 201, 205. When the shifting sleeve 218 is displaced by the fourth shift fork 188 to the right with respect to FIG. 7, the shifting sleeve 218 engages the transmission gear 202, so that the transmission gear 202 becomes rotatably fixed to the transmission shaft 196 for rotating with it. When the fourth shift fork 188 is displaced to the left with respect to FIG. 7, the transmission gear 201 engages the transmission gear 200 (the transmission gear 201 being a dog gear) and the transmission gear 200 becomes rotatably fixed to the transmission shaft 196 for rotating with it. When the third shift fork is displaced to the right with respect to FIG. 7, the transmission gear 205 engages the transmission gear 206 (the transmission gear 205 being a dog gear) and the transmission gear 206 becomes rotatably fixed to the transmission shaft 196 for rotating with it. When the shifting sleeve 228 is displaced by the third shift fork to the left with respect to FIG. 7, the shifting sleeve 228 engages the transmission gear 204, so that the transmission gear 204 becomes rotatably fixed to the transmission shaft 196 for rotating with it. Only one of the transmission gears 200, 202, 204, 206 can be engaged at a time. When the one of transmission gears 202, 204 is engaged by its corresponding shifting sleeve 218, 228, a rotation of the engaged transmission gear 202, 204 is transferred from the corresponding input gear 113, 115 for transmitting rotation from the input shaft 104 to the transmission shaft 196. When the transmission gears 200, 206 are engaged by its corresponding shifting sleeves 218, 228 via the corresponding transmission gears 201, 205 (being dog gears), a rotation of the engaged transmission gears 200, 206 is transferred from the corresponding input gears 111, 117 for transferring rotation from the input shaft 104 to the transmission shaft 196.

The transmission 100 has other features well known in the art. The transmission 100 is only one example of transmission for the three-wheel vehicle 10.

The transmission 100 includes a gear locking mechanism 300. The gear locking mechanism 300 is movable between a first position and a second position. In the first position, the transmission 100 is prevented from shifting between the neutral 70 and second 72 shift positions, and in the second position the transmission 100 is prevented from shifting to the reverse shift position 69.

Figure 8:
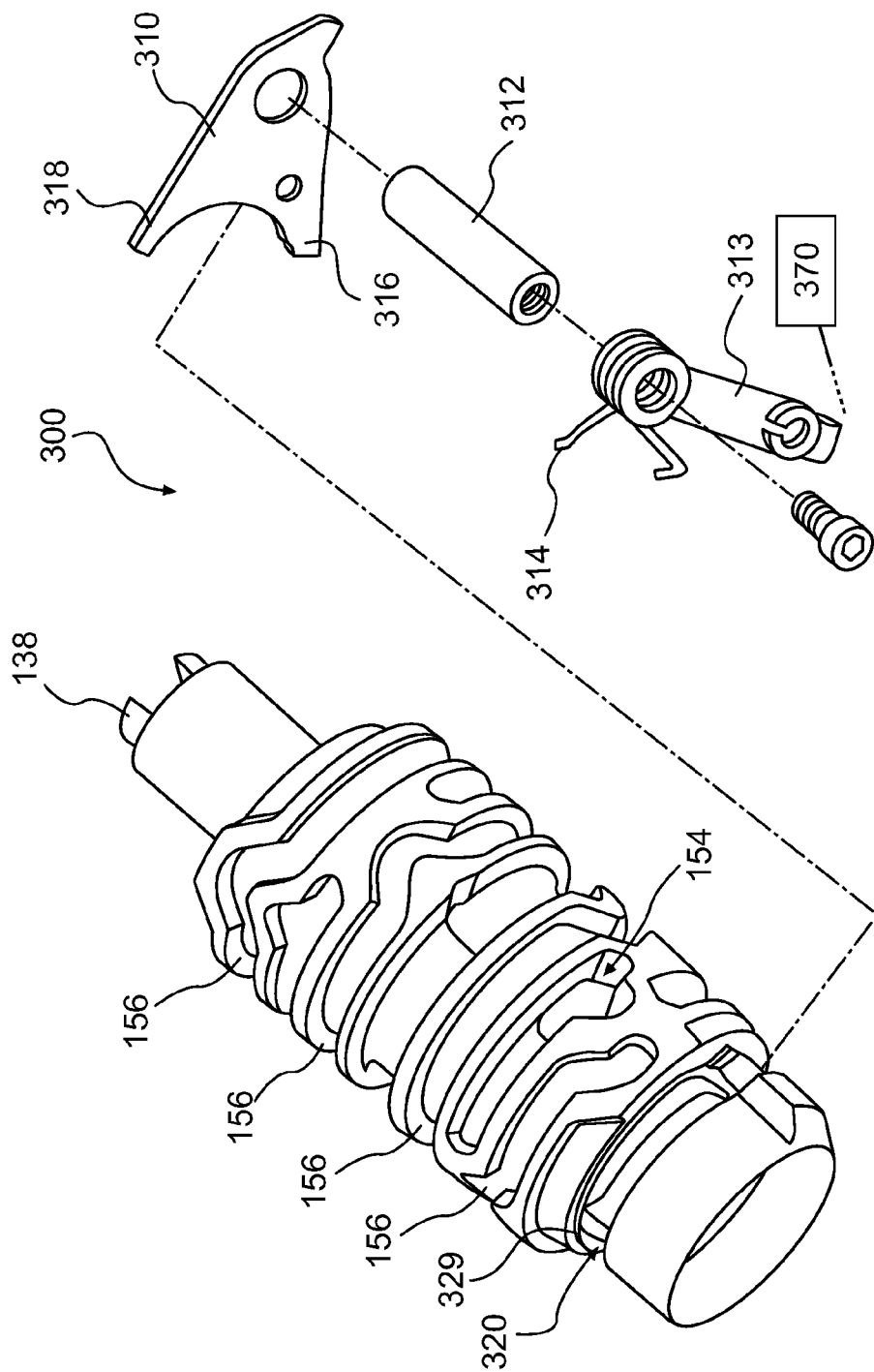
FIG. 8 is an exploded perspective view of some elements of the transmission of FIG. 4.

Referring more specifically to FIG. 8, the gear locking mechanism 300 comprises a lock lever 310 supported in rotation by a gear locking shaft 312 disposed parallel to the shift drum shaft 138. The lock lever 310 is in selective abutment with a drum 320 rotatably fixed to the shift drum shaft 138. As will be described below, when the lock lever 310 abuts the drum 320, the shift drum 154 is prevented from rotating beyond certain positions and, as a consequence, gear shifting is prevented.

The gear locking shaft 312 (and hence the lock lever 310) is operatively rotatable between the first position and the second position via a mechanical system 370 (shown schematically). The mechanical mechanism 370 is connected to the gear locking shaft 312 via arm 313. A pull wire (not shown) connects the arm 313 to a solenoid (not shown) actuated electrically by the gear locking button 103. It is contemplated that the system 370 could be other than electrical. For example, the system 370 could be hydraulic, mechanical, electronical or a combination of the above. By default, the gear locking button 103 is not pressed, the gear locking mechanism 300 is actuated, and the lock lever 310 is in the second position. When the gear locking button 103 is pressed, the gear locking mechanism 300 becomes deactuated, and the gear locking shaft 312 is rotated to move the lock lever 310 in the first position so as to release the reverse shift position 69 and to lock the second shift position 72, as will be described below. It is contemplated that the first position could be the default position of the gear locking mechanism 300. It is contemplated that the gear locking button 103 could have two actuated positions, each corresponding to one of the first and second positions. It is also contemplated that a third position (being neither the first nor the second position) could be the default position. It is also contemplated that the actuation of the gear locking button 103 could be done automatically by a vehicle control system, based on driving conditions. It is also contemplated that the actuation of the lock lever 310 could be done automatically by a vehicle control system, based on driving conditions, and as such the gear locking button 103 could be omitted. The first and second positions will be described in detail below.

A return spring 314 is disposed around the gear locking shaft 312. The spring 314 is used to return locking mechanism 300 into the default position. It is contemplated that the spring 314 could be omitted.

The drum 320 is integrally formed with the shift drum 154 at one end thereof. The drum 320 is sequentially rotatable between the eight gear shift positions in the upshift direction 350 and the same eight gears in the downshift direction 351. The drum 320 is generally circular and is of a smaller diameter than the shift drum 154. It is contemplated that the drum 320 could have the same or a bigger diameter than the shift drum 154. It is also contemplated that the drum 320 could be not integrally formed with or adjacent to the shift drum 154. It is contemplated that the drum 320 could be disposed between the grooves 156 of the shift drum 154. It is also contemplated that the drum 320 could be disposed at the other end of the shift drum 154. The drum 320 has a circumferential groove 329 defined therein. The groove 329 has a variable depth (depth being computed with respect to a center of the drum 320) and a constant width (width being computed with respect to a longitudinal direction of the shift drum shaft 138). It is contemplated that the groove 329 could have a constant depth and a variable width. It is contemplated that the drum 320 could be omitted. For example, the shift drum shaft 138 could be designed to cooperate with the lock lever 310. The shift drum shaft 138 could have grooves, projections or recesses to selectively mate with the lock lever 310. It should be understood that the groove 329 is only one of the embodiments that would allow the drum 320 to cooperate with the lock lever 310. For example, the groove 329 could be replaced by projections mating with other projections or recesses in the lock lever 310.

The lock lever 310 is generally flat and has first and second arms 318, 316. The first arm 318 is longer than the second arm 316. A connection between the first and second arms 318, 316 forms a "U". It is contemplated that the arms 316, 318 could have the same length, and that the connection between the first and second arms 318, 316 could be of a shape different from a "U". The first arm 318 and the second arm 316 are selectively abutting a first abutment surface 324 and a second abutment surface 322 (shown in FIG. 9B) of the drum 320, respectively, depending on the position of the lock lever 310 (second and first positions) and depending on one of the eight positions of the drum 320, as will be described below.

Figure 9A:
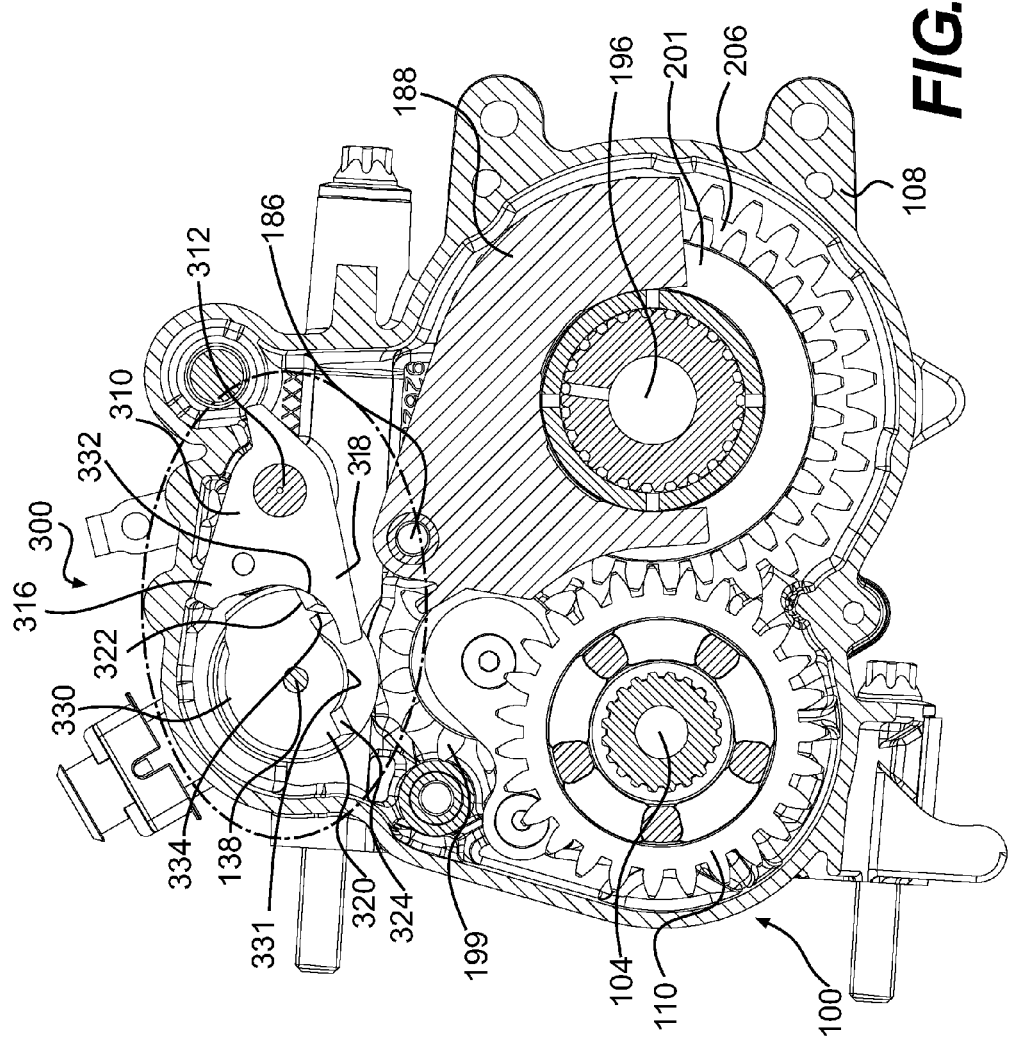
FIG. 9A is a cross-sectional right side view of the transmission of FIG. 4 with a drum in a position corresponding to engaging a reverse shift position and a locking mechanism in a first position.
Figure 9B:
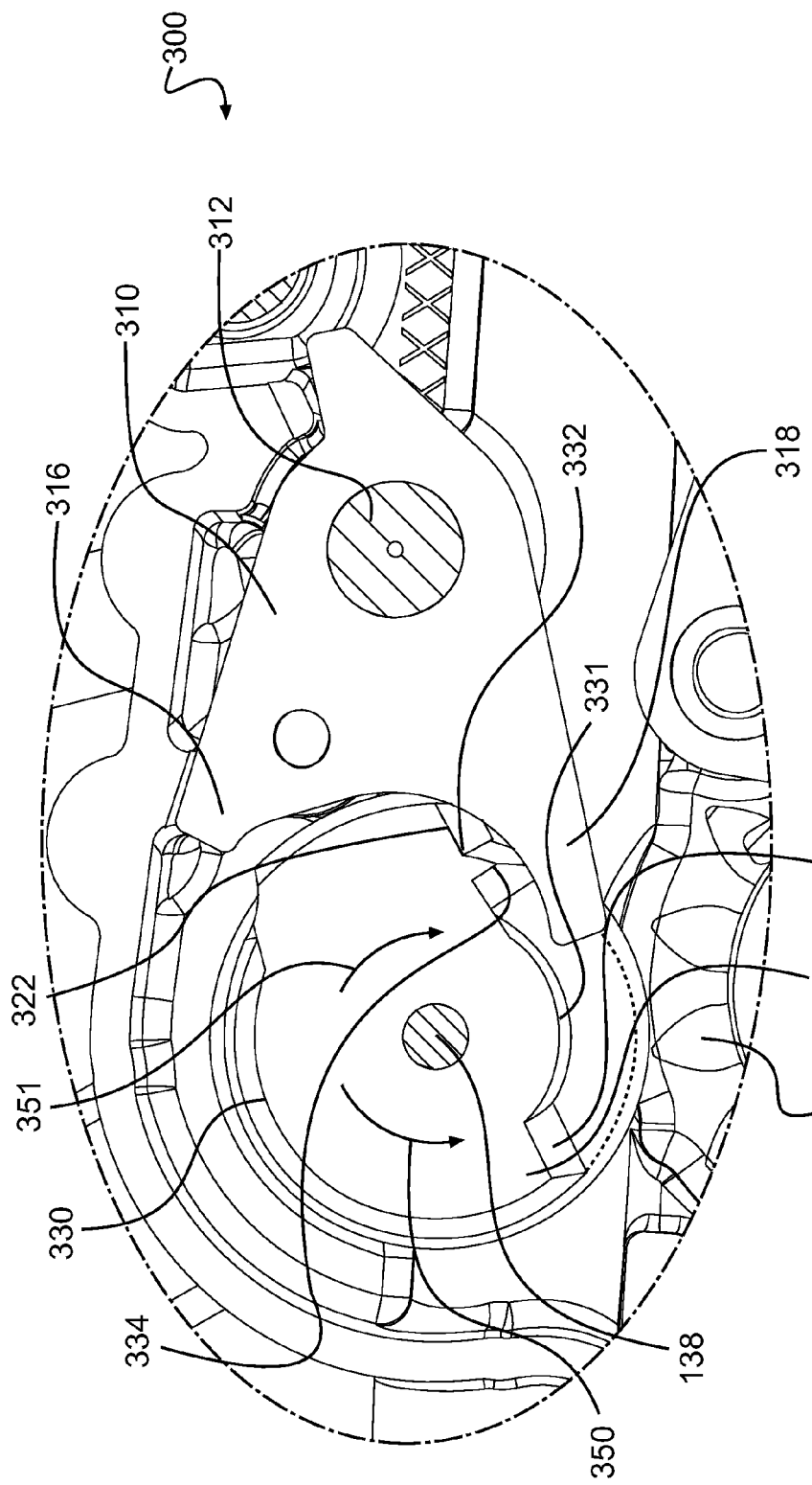
FIG. 9B is a close up view of the locking mechanism of FIG. 9A.

As best seen in FIG. 9B, the groove 329 of the drum 320 includes a first groove portion 331 and a second groove portion 330. The groove portions 330, 331 are circumferential grooves extending on a portion of a circumference of the drum 320. The second groove portion 330 is disposed adjacent to an external edge of the drum 320 and the first groove portion 331 is disposed adjacent to and inwardly from the second groove portion 330. A boundary between the first groove portion 331 and the second groove portion 330 is shown in dotted lines in FIG. 9B. The first groove portion 331 is circumferentially shorter than the second groove portion 330. The second groove portion 330 ends with the second abutment surface 322 in the upshift direction 350. The first groove portion 331 ends with the first abutment surface 324 in the downshift direction 351. It is contemplated that the groove portions 330, 331 could be different from circumferential grooves and that the first groove portion 331 could be longer than the second groove portion 330. As will be seen below, the abutment surfaces 322, 324 are designed to selectively cooperate with the arms 316, 318 for preventing the shift drum 154 from rotating.

Figure 12:
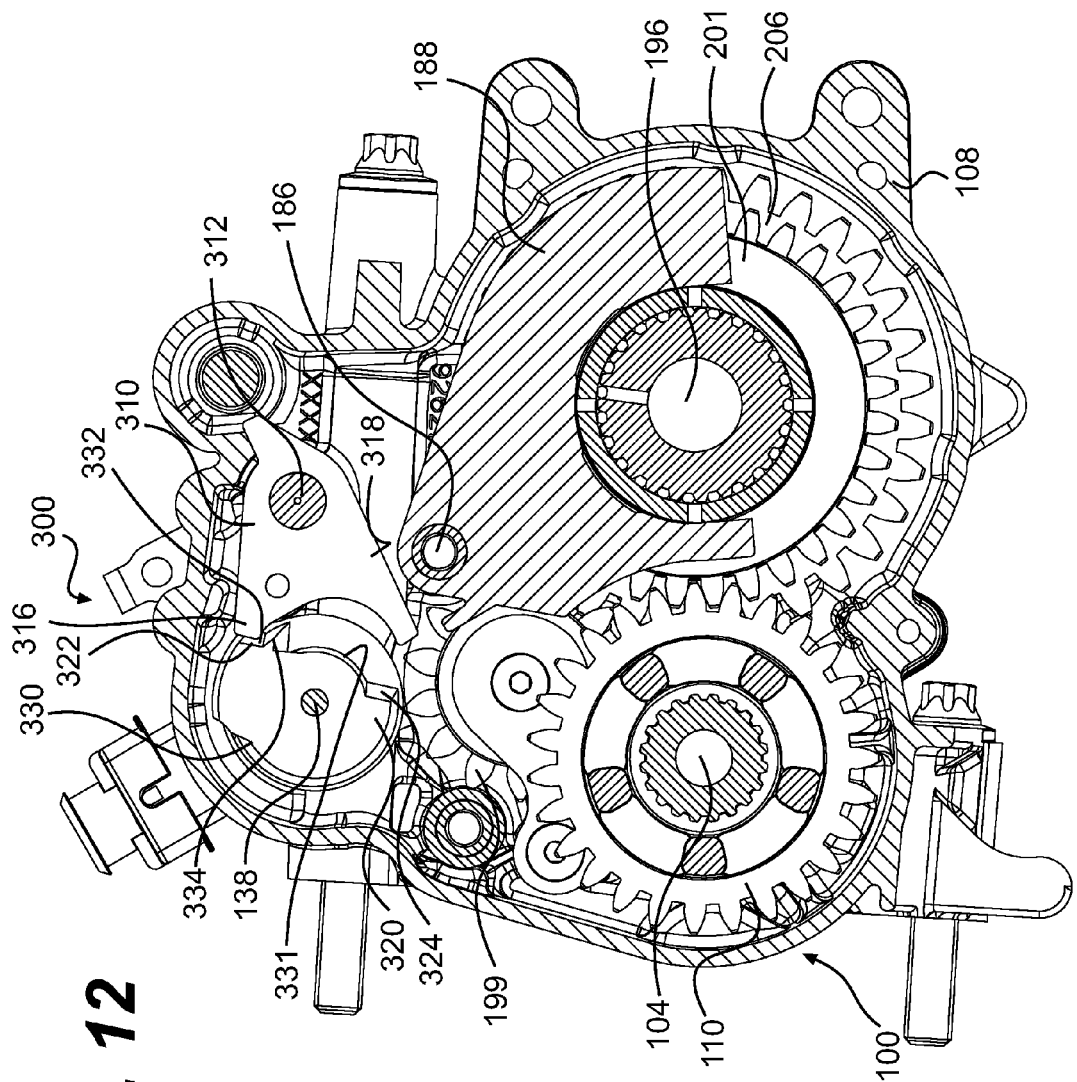
FIG. 12 is the cross-sectional right side view of FIG. 9A with the drum in the position corresponding to engaging the first shift position and the locking mechanism in a second position.

An apex 334 separates another end of the second groove portion 330 from the second abutment surface 322. As seen from a right side, the apex 334 and the second abutment surface 322 define an indentation 332. As best seen in FIG. 12, the indentation 332 is congruent with a portion of the second arm 316 extending into the drum 320 when the lock lever 310 is in the second position. It is contemplated that the apex 334 could be omitted. It is also contemplated that the indentation 332 could have a shape different from the one shown in FIG. 9A and could not be congruent with the portion of the second arm 316 extending into the drum 320 when the lock lever 310 is in the second position. It is also contemplated that the apex 334 could be omitted.

The gear locking mechanism 300 functions as follows. As mentioned above, by default, the gear locking mechanism 300 is actuated and the lock lever 310 is in the second position. When the lock lever 310 is in the second position (shown in FIGS. 12 to 18), the second arm 316 is received in the second groove portion 330. When the drum 320 is in a position corresponding to a position of the shift drum 154 operatively engaging the first shift position 71, the second arm 316 abuts the second abutment surface 322 (shown in FIG. 12). As a consequence, when the lock lever 310 is in the second position, the operator is prevented by the gear locking mechanism 300 from downshifting to the reverse shift position 69. The reverse shift position 69 is a second locked shift position. It is contemplated that the lock lever 310 could prevent to engage a shift position other than the reverse shift position 69. It is also contemplated that more than one shift position could be the second locked shift position. For example, the second locked shift position could be the group of locked shift positions: reverse shift position 69, first shift position 71 and neutral shift position 70 if the downshifting from the second shift position 72 to the neutral shift position 70 was prevented when the lock lever 310 is in the second position. When the lock lever 310 is in the second position, it is still possible to upshift and downshift sequentially between the first 71 and the sixth 76 shift positions. The first shift position 71, the sixth shift position 76 and the shift positions sequentially in between are second unlocked shift positions. It is contemplated that the second unlocked shift positions could be shift positions other than the shift positions sequentially between the first 71 and the sixth 76 shift positions.

When the operator presses on the gear locking button 103, the gear locking mechanism 300 becomes deactivated. The lock lever 310 moves to the first position. It is now possible to downshift from the first shift position 71 to the reverse shift position 69, but the gear locking mechanism 300 now prevents from shifting from the neutral shift position 70 to the second shift position 72. When the lock lever 310 is in the first position (shown in FIGS. 9 to 11), the first arm 318 is received in the first groove portion 331. When the drum 320 is in a position corresponding to a position of the shift drum 154 operatively engaging the neutral shift position 70, the first arm 318 abuts against the first abutment surface 324 (shown in FIG. 11). As a consequence, when the lock lever 310 is in the first position, the operator is prevented by the gear locking mechanism 300 from upshifting to the second shift position 72. Preventing to shift from the neutral shift position 70 to the second shift position 72 may help the operator to find the neutral shift position 70. The second shift position 72 and the shift positions sequentially after the second shift position 72 in the upshift direction 350 are first locked shift positions. It is contemplated that, the lock lever 310 could prevent to engage shifting positions other than the second shift position 72. It is contemplated that the first locked shift positions could comprise only one shift position. For example, the first locked shift position could be the sixth shift position 76. It is also contemplated that the first locked shift positions could be shift positions other than the ones recited above. When the lock lever 310 is in the first position, it is still possible to upshift and downshift sequentially between the reverse shift position 69 and the neutral shift position 70. The reverse shift position 69, the neutral shift position 70 and the first shift position 71 are first unlocked shift positions. It is contemplated that the first unlocked shift positions could be shift positions other than the shift positions sequentially between the reverse shift position 69 and the neutral shift position 70.

Turning now to FIGS. 9A to 18, the different positions of the gear locking mechanism 300 (combination of a position of the lock lever 310 and a position of the drum 320) will be described in greater detail.

In FIG. 9A, the lock lever 310 is in the first position, and the first arm 318 is received in the first groove portion 331. As mentioned above, when the lock lever 310 is in the first position, the second shift position 72 is the first locked shift position when upshifting, and the reverse shift position 69, first shift position 71 and neutral shift position 70 are first unlocked shift positions. The drum 320 is in the position corresponding to the shift drum 154 operatively engaging the reverse shift position 69. The first shift position 71, which is sequentially next to the reverse shift position 69 in the upshift direction 350, may be engaged when rotating the shift drum shaft 138 in the upshift direction 350. No gear can be engaged in the downshift direction 351 since the reverse shift position 69 is the last shift position in the downshifting sequence.

Figure 10:
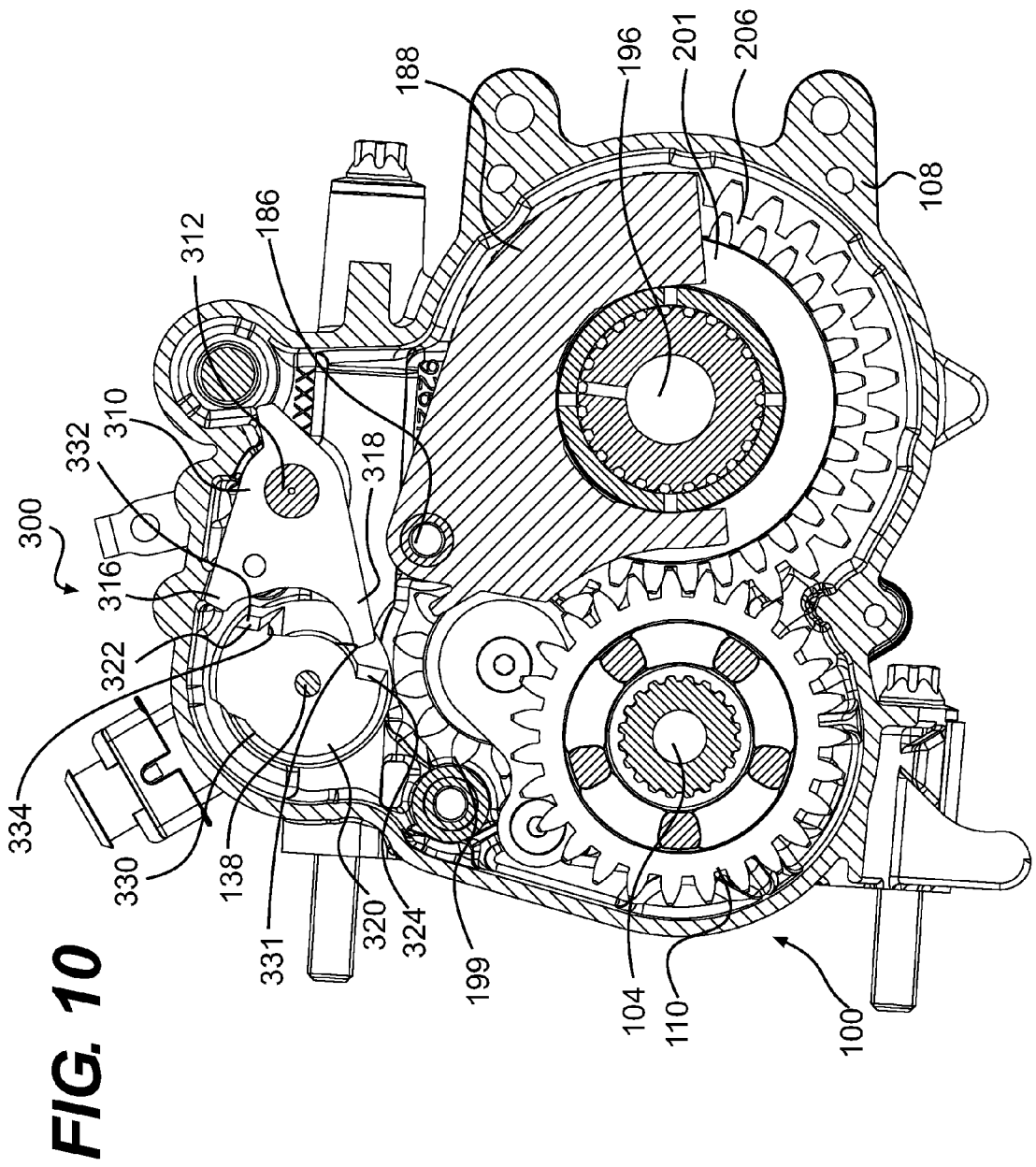
FIG. 10 is the cross-sectional right side view of FIG. 9A with the drum in a position corresponding to engaging a first shift position and the locking mechanism in the first position.

In FIG. 10, the lock lever 310 is in the first position, and the drum 320 is in a position corresponding to the shift drum 154 operatively engaging the first shift position 71. The neutral shift position 70, which is sequentially next to the first shift position 71 in the upshift direction 350, may be engaged when rotating the shift drum shaft 138 in the upshift direction 350. The reverse shift position 69 can still be engaged in the downshift direction 351.

Figure 11:
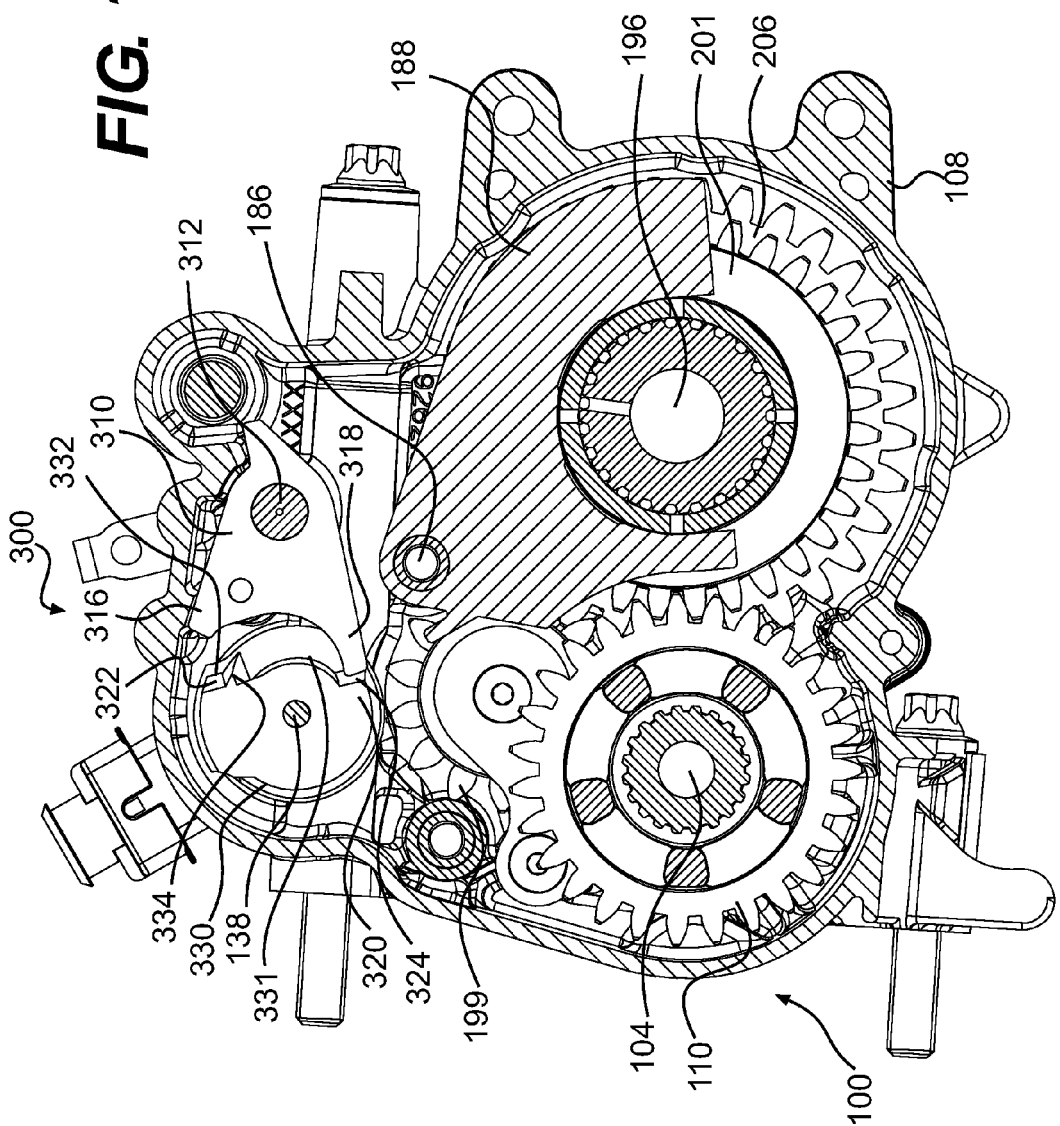
FIG. 11 is the cross-sectional right side view of FIG. 9A with the drum in a position corresponding to engaging a neutral shift position and the locking mechanism in the first position.

In FIG. 11, the lock lever 310 is in the first position, and the drum 320 is in a position corresponding to the shift drum 154 operatively engaging the neutral shift position 70. The second shift position 72, which is sequentially next to the neutral shift position 70 in the upshift direction 350 cannot be engaged when rotating the shift drum shaft 138 in the upshift direction 350 because the second arm 318 of the lever 310 abuts against the second abutment surface 324 of the drum 320. The first shift position 71 can still be engaged in the downshift direction 351.

In FIG. 12, the lock lever 310 is in the second position, and the drum 320 is in a position corresponding to the shift drum 154 operatively engaging the first shift position 71. As mentioned above, the reverse shift position 69 is the second locked shift position when shifting in the downshifting direction 350, and all the other shifting positions are the second unlocked shift positions. The reverse shift position 69, which is sequentially next to the first shift position 71 in the downshift direction 351, cannot be engaged when rotating the shift drum shaft 138 in the downshift direction 351 because the first arm 316 of the lever 310 abuts against the first abutment surface 322 of the drum 320. The neutral shift position 70, which is sequentially next to the first shift position 71 in the upshift direction 350, may be engaged when rotating the shift drum shaft 138 in the upshift direction 350. The second shift position 72 which is sequentially next to the neutral shift position 70 in the upshift direction 350 may also be engaged directly from the first shift position 71 without stopping at the neutral shift position 70.

Figure 13:
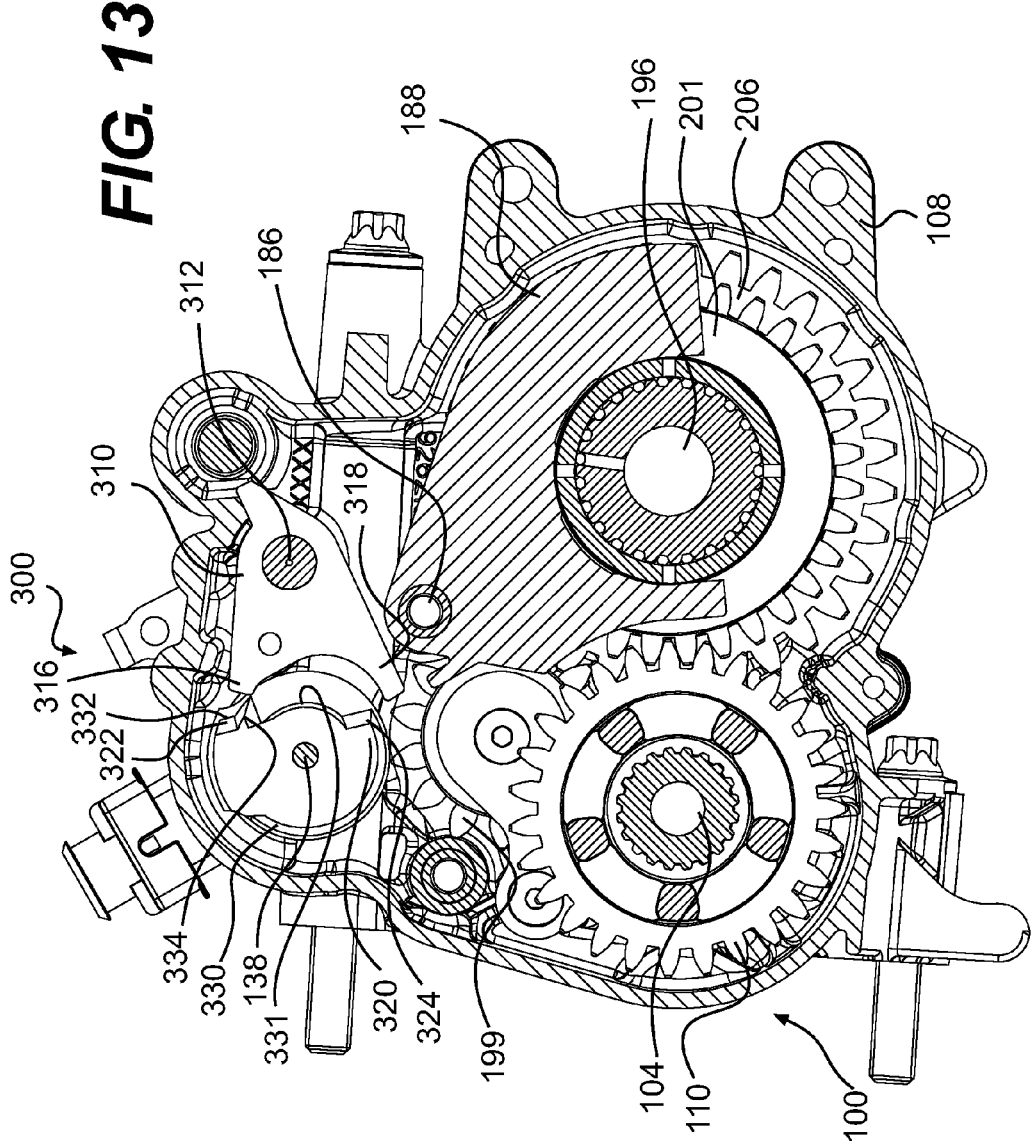
FIG. 13 is the cross-sectional right side view of FIG. 9A with the drum in the position corresponding to engaging the neutral shift position and the locking mechanism in the second position.

In FIG. 13, the lock lever 310 is in the second position, and the drum 320 is in a position corresponding to the shift drum 154 operatively engaging the neutral shift position 70. The second shift position 72, which is sequentially next to the neutral shift position 70 in the upshift direction 350, may be engaged when rotating the shift drum shaft 138 in the upshift direction 350. The first shift position 71 can still be engaged in the downshift direction 351.

Figure 14:
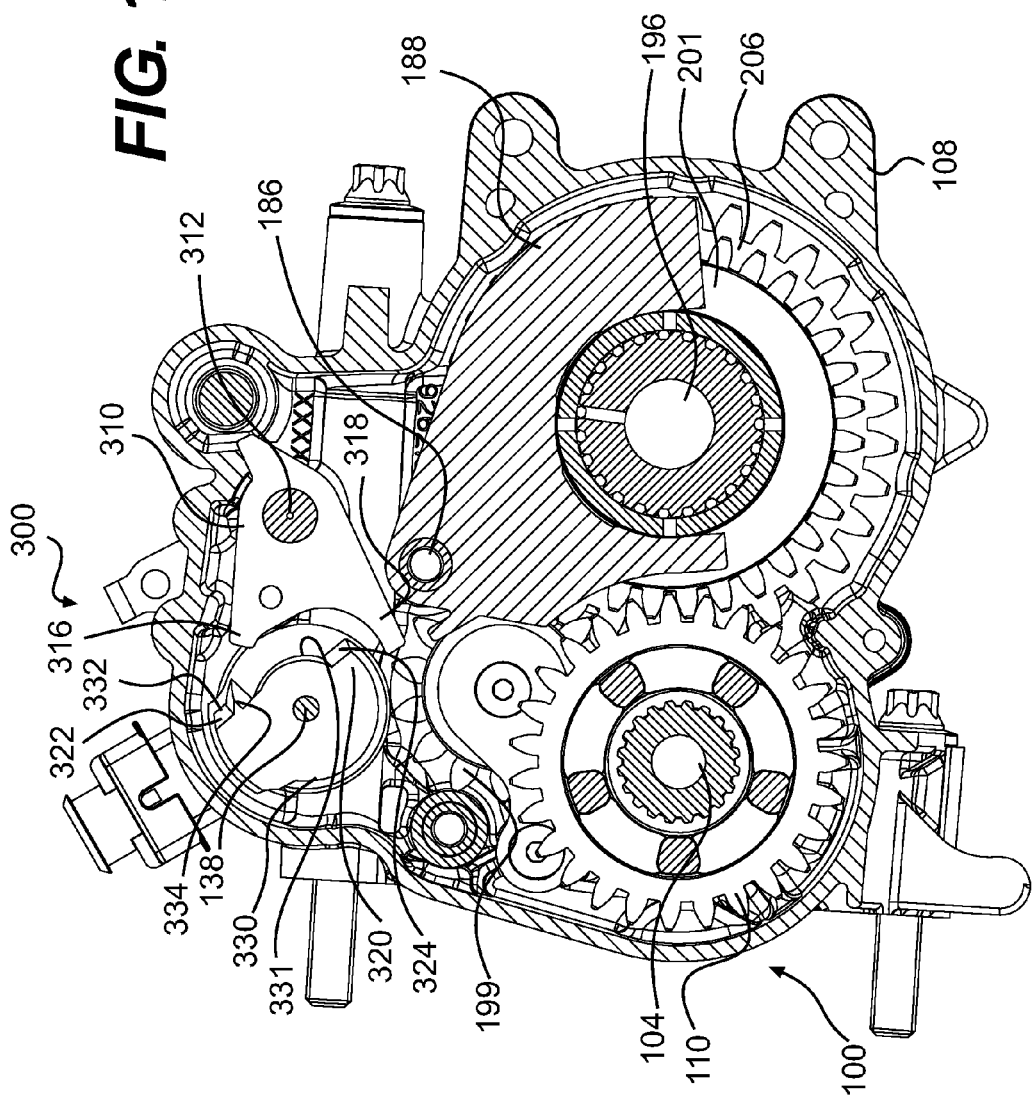
FIG. 14 is the cross-sectional right side view of FIG. 9A with the drum in a position corresponding to engaging a second shift position and the locking mechanism in the second position.

In FIG. 14, the lock lever 310 is in the second position, and the drum 320 is in the position corresponding to the shift drum 154 operatively engaging the second shift position 72. The third shift position 73, which is sequentially next to the second shift position 72 in the upshift direction 350, may be engaged when rotating the shift drum shaft 138 in the upshift direction 350. The neutral shift position 70 can still be engaged in the downshift direction 351. The first shift position 71 may also be engaged in the downshift direction 351 directly from the second shift position 72 without stopping at the neutral shift position 70.

Figure 15:
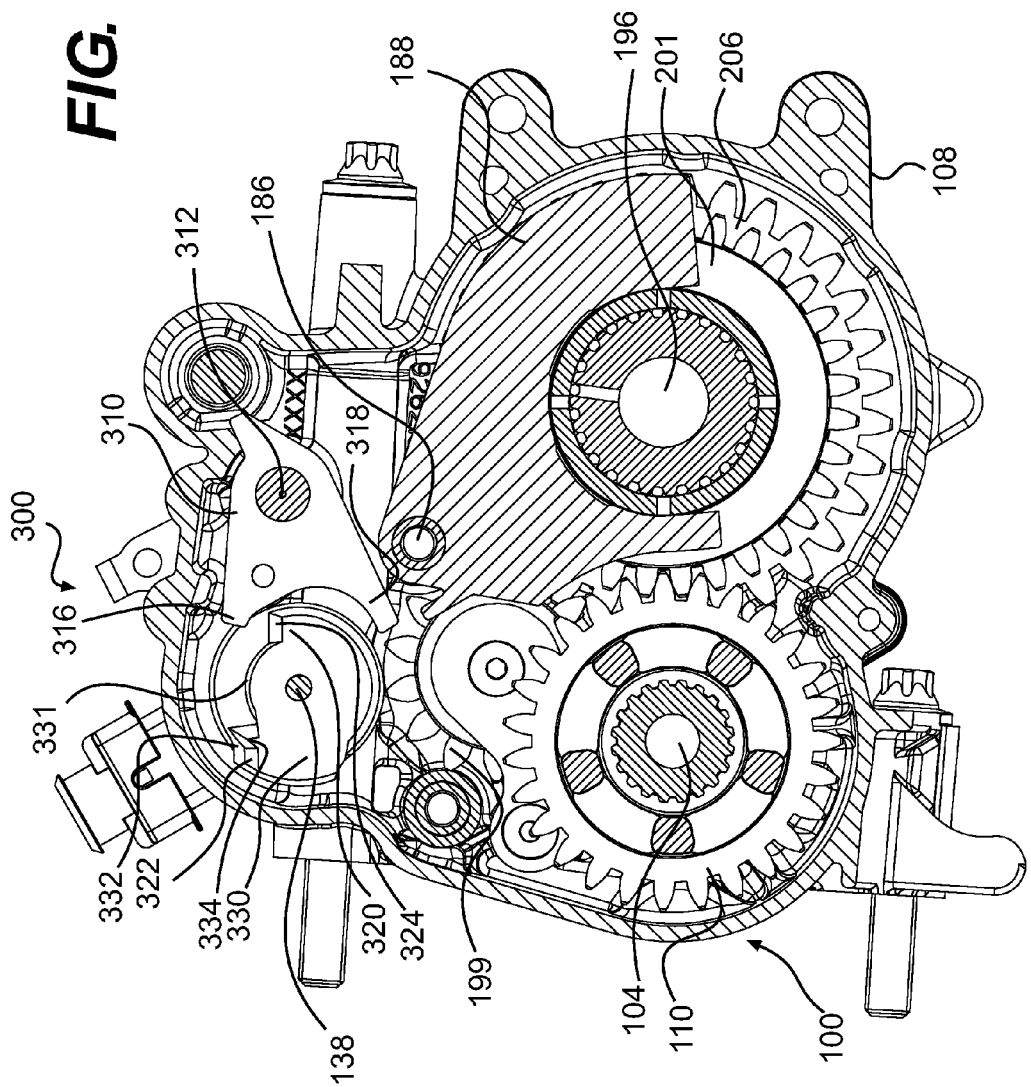
FIG. 15 is the cross-sectional right side view of FIG. 9A with the drum in a position corresponding to engaging a third shift position and the locking mechanism in the second position.

In FIG. 15, the lock lever 310 is in the second position, and the drum 320 is in a position corresponding to the shift drum 154 operatively engaging the third shift position 73. The fourth shift position 74, which is sequentially next to the third shift position 73 in the upshift direction 350, may be engaged when rotating the shift drum shaft 138 in the upshift direction 350. The second shift position 72 can still be engaged in the downshift direction 351.

Figure 16:
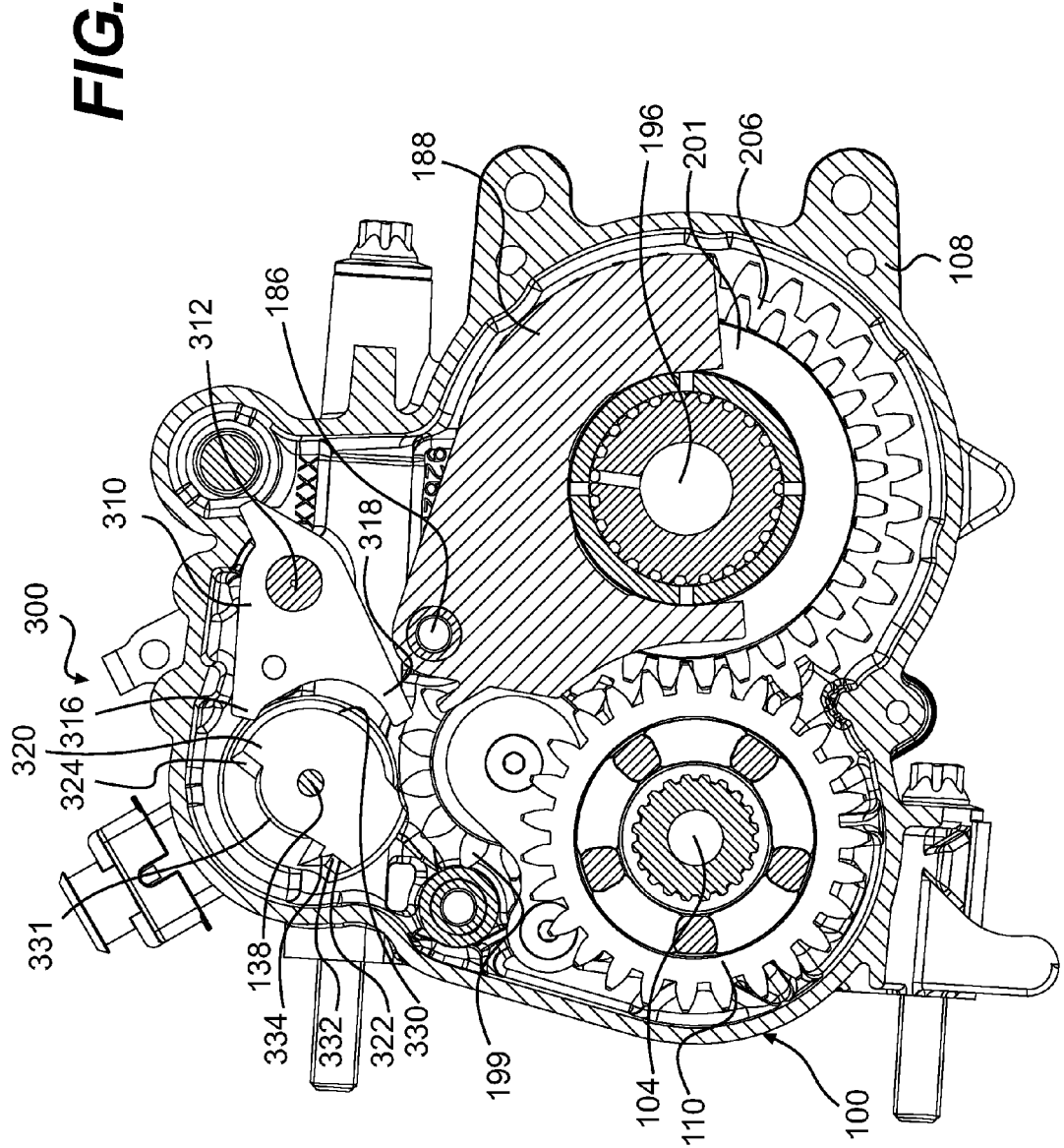
FIG. 16 is the cross-sectional right side view of FIG. 9A with the drum in a position corresponding to engaging a fourth shift position and the locking mechanism in the second position.

In FIG. 16, the lock lever 310 is in the second position, and the drum 320 is in a position corresponding to the shift drum 154 operatively engaging the fourth shift position 74. The fifth shift position 75, which is sequentially next to the fourth shift position 74 in the upshift direction 350, may be engaged when rotating the shift drum shaft 138 in the upshift direction 350. The third shift position 73 can still be engaged in the downshift direction 351.

Figure 17:
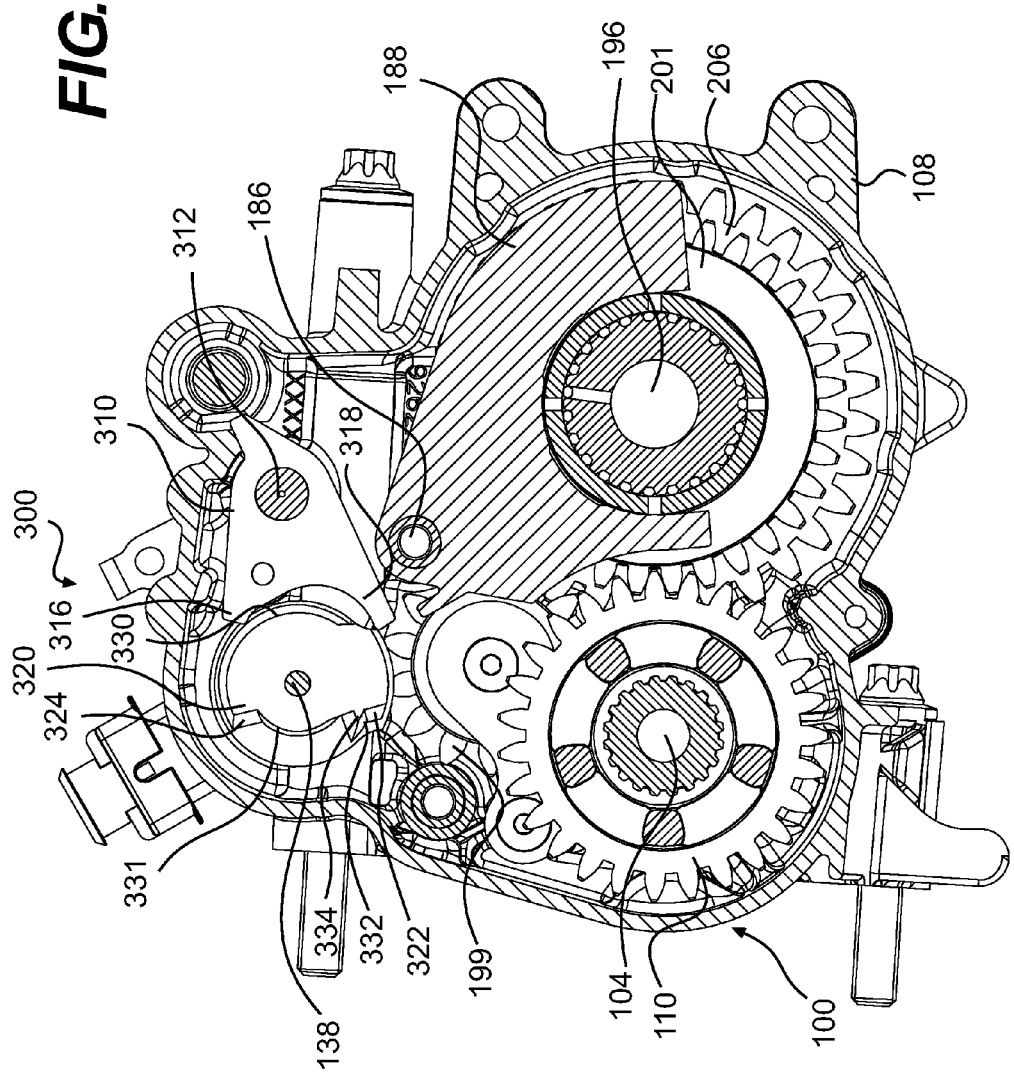
FIG. 17 is the cross-sectional right side view of FIG. 9A with the shift drum in a position corresponding to engaging a fifth shift position and the locking mechanism in the second position.

In FIG. 17, the lock lever 310 is in the second position, and the drum 320 is in a position corresponding to the shift drum 154 operatively engaging the fifth shift position 75. The sixth shift position 75, which is sequentially next to the fifth shift position 75 in the upshift direction 350, may be engaged when rotating the shift drum shaft 138 in the upshift direction 350. The fourth shift position 74 can still be engaged in the downshift direction 351.

Figure 18:
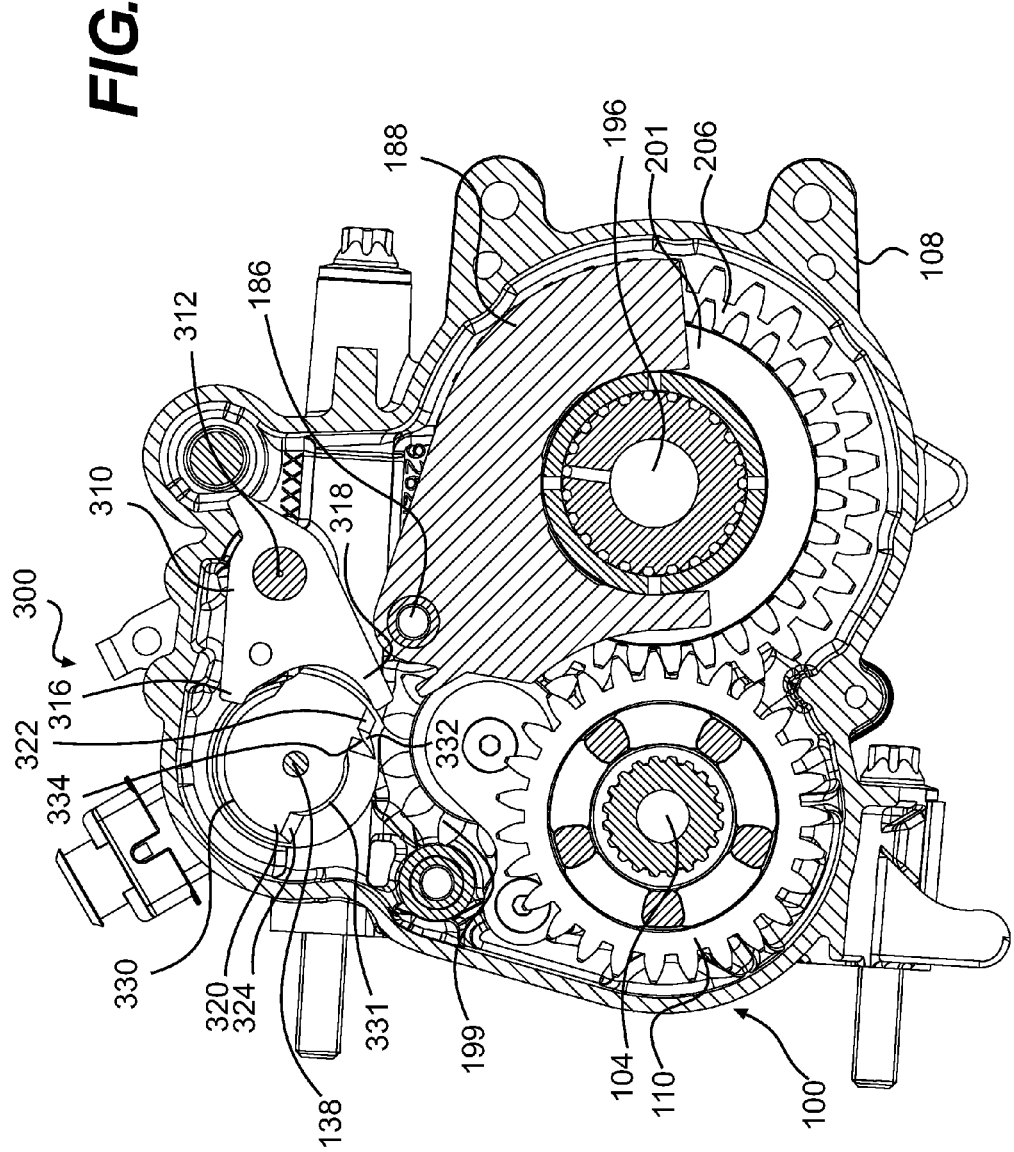
FIG. 18 is the cross-sectional right side view of FIG. 9A with the shift drum in a position corresponding to engaging a sixth shift position and the locking mechanism in the second position.

In FIG. 18, the lock lever 310 is in the second position, and the drum 320 is in a position corresponding to the shift drum 154 operatively engaging the sixth shift position 76. No other shift position may be engaged when rotating the shift drum shaft 138 in the upshift direction 350, since the sixth shift position 76 is the last one in the upshift direction 350. The fifth shift position 75 can still be engaged in the downshift direction 351.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:
1. A vehicle transmission comprising:
an input shaft;
first, second and third input gears disposed on the input shaft;
an idler gear engaging the first input gear;

a transmission shaft disposed parallel to the input shaft, the input shaft selectively driving the transmission shaft;

first, second, and third transmission gears disposed on the transmission shaft, the first transmission gear engaging the idler gear, the second transmission gear engaging the second input gear, the third transmission gear engaging the third input gear;

a shift drum shaft disposed parallel to the transmission shaft;

at least one shift drum disposed on the shift drum shaft, the at least one shift drum being selectively operatively connected to the first, second, and third input gears and the first, second and third transmission gears, the at least one shift drum being rotatable:
sequentially between a reverse shift position, a first forward shift position, a neutral shift position, and a second forward shift position in a first direction, and
sequentially between the second forward shift position, the neutral shift position, the first forward shift position, and the reverse shift position in a second direction, when in the reverse shift position, the at least one shift drum operatively engages one of the first input gear and the first transmission gear such that the input shaft drives the transmission shaft via the first input gear, the first transmission gear and the idler gear, when in the first forward shift position, the at least one shift drum operatively engages
one of the second input gear and the second transmission gear such that the input shaft drives the transmission shaft via the second input gear and the second transmission gear when in the neutral shift position, the at least one shift drum operatively engages
none of the first, second, and third input gears, and the first, second and third transmission gears, such that the transmission shaft is not driven by the input shaft, and when in the second forward shift position, the at least one shift drum operatively engages the third input gear and the third transmission gear such that the input shaft drives the transmission shaft via the third input gear and the third transmission gear; and a locking mechanism selectively preventing the at least one shift drum from rotating, the locking mechanism being movable between a first position and a second position, the locking mechanism being normally biased toward the second position, when in the first position, the locking mechanism prevents the at least one shift drum from rotating in the first direction between the neutral shift position and the second forward shift position, and permits rotation of the at least one shift drum sequentially between the neutral shift position and the reverse shift position, when in the second position, the locking mechanism prevents the at least one shift drum from rotating in the second direction between the first forward shift position and the reverse shift position, and permits rotation of the at least one shift drum sequentially between the first forward shift position and the second forward shift position.

2. The vehicle transmission of claim 1, wherein the locking mechanism comprises:
a drum rotatably disposed on the shift drum shaft; and
a lever pivotable between a first and a second position, the lever selectively abutting the drum for preventing the drum to rotate,
when the locking mechanism is in the first position, the lever is in the first position and the lever abuts the drum, and
when the locking mechanism is in the second position, the lever is in the second position and the lever abuts the drum.

3. The vehicle transmission of claim 2, wherein the drum is integrally formed with the at least one shift drum.

4. The vehicle transmission of claim 2, wherein:
the lever has first and second abutment surfaces,
the drum has corresponding first and second abutment surfaces,
when the locking mechanism is in the first position, the first abutment surface of the lever abuts against the corresponding first abutment surface of the drum when preventing the at least one shift drum from rotating in the first direction to engage the first locked position, and
when the locking mechanism is in the second position, the second abutment surface of the lever abuts against the corresponding second abutment surface of the drum when preventing the at least one shift drum from rotating in the second direction to engage the second locked position.

5. The vehicle transmission of claim 4, wherein the first abutment surface of the drum is an end of a first recess, and the second abutment surface of the drum is an end of a second recess.

6. The vehicle transmission of claim 5, wherein the first and second recesses are portions of circumferential grooves.

7. The vehicle transmission of claim 5, wherein the first and second recesses are separated by an apex.

8. The vehicle transmission of claim 5, wherein:
the lever has a first arm and a second arm,
the first arm includes the first abutment surface of the lever, and
the second arm includes the second abutment surface of the lever.

9. The vehicle transmission of claim 8, wherein the first arm is longer than the second arm, and the first recess is disposed radially inwardly of the second recess with respect to the drum.

* * * * *